United States Patent [19]
Gray et al.

[11] Patent Number: 5,603,030
[45] Date of Patent: Feb. 11, 1997

[54] METHOD AND SYSTEM FOR DESTRUCTION OF OBJECTS USING MULTIPLE DESTRUCTOR FUNCTIONS IN AN OBJECT-ORIENTED COMPUTER SYSTEM

[75] Inventors: Jan Gray, Redmond, Wash.; Martin O'Riordan, Maynooth, Ireland

[73] Assignee: Microsoft Corporation, Redmond, Wash.

[21] Appl. No.: 1,533

[22] Filed: Jan. 7, 1993

[51] Int. Cl.$^6$ ............................................. G06F 9/45
[52] U.S. Cl. ............................................... 395/705
[58] Field of Search ........................... 395/375, 600, 395/650, 700

[56] References Cited

U.S. PATENT DOCUMENTS 5,247,669  9/1993  Abraham et al. ................... 395/600

OTHER PUBLICATIONS

Michael Floyd, "Turbo Pascal with Objects: Combining the Object–Oriented Approach with Structured Concepts", *Dr. Dobb's Journal of Software Tools*, Jul. 1989, vol. 14, No. 7, p. 56(8).

Rex Jaeschke, "Dynamic Memory Allocation in C$^{++}$" (Let's C Now), *DEC Professional*, Jan. 1991, vol. 10, No. 1, p. 90(5).

Ken Arnold, "New Kid on the Blocks (C$^{++}$ Advisor)", *UNIX Review*, Oct. 1992, vol. 10, No. 10, p. 85(2).

*Primary Examiner*—William M. Treat
*Attorney, Agent, or Firm*—Seed and Berry LLP

[57] ABSTRACT

A method and system for generating code to destroy objects is provided. In a preferred embodiment, a compiler generates a plurality of destructor functions for the class. Each destructor function performs a subset of the destruction process. The compiler generates code to invoke one of the plurality of destructor functions to destroy an object of the class. In a preferred embodiment, destructor functions are generated to destroy an object that is not ultimately derived, to destroy an object that is ultimately derived, to destroy an object that is ultimately derived and to deallocate the object memory, to destroy an array of objects, and to destroy an array of objects and to deallocate the memory of the array.

83 Claims, 17 Drawing Sheets

METHOD AND SYSTEM FOR DESTRUCTION OF OBJECTS USING MULTIPLE DESTRUCTOR FUNCTIONS IN AN OBJECT-ORIENTED COMPUTER SYSTEM

TECHNICAL FIELD

This invention relates generally to the field of compilers for computer programming languages and, more specifically, to compilers for languages having object-oriented features.

BACKGROUND OF THE INVENTION

The use of object-oriented programming techniques can facilitate the development of complex computer programs. Programming languages that support object-oriented techniques have been developed. One such programming language is C++.

Two common characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use of classes. A class is a user-defined type. A class declaration describes the data members and function members of the class. For example, the following declaration defines data members and a function member of a class named CIRCLE.

```
class CIRCLE
{   int x, y;
    int radius;
    void draw();
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates on an instance of the class. An instance of a class is also called an object of the class.

In the syntax of C++, the following statement declares the objects a and b to be of type class CIRCLE.

CIRCLE a, b;

This declaration causes the allocation of memory for the objects a and b, such an allocation is called an instance of the class. The following statements assign data to the data members of objects a and b.

```
a.x      = 2;
a.y      = 2;
a.radius = 1;
b.x      = 4;
b.y      = 5;
b.radius = 2;
```

The following statements are used to draw the circles defined by objects a and b.

a.draw();
b.draw();

A derived class is a class that inherits the characteristics—data members and function members—of its base classes. For example, the following derived class CIRCLE_FILL inherits the characteristics of the base class CIRCLE.

```
class CIRCLE_FILL : CIRCLE
{   int pattern;
    void fill();
};
```

This declaration specifies that class CIRCLE_FILL includes all the data and function members that are in class CIRCLE in addition to the those data and function members introduced in the declaration of class CIRCLE_FILL, that is, data member pattern and function member fill. In this example, class CIRCLE_FILL would have data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL). A class that does not inherit the characteristics of another class is a primary class (e.g., CIRCLE). A class whose characteristics are inherited by another class is a base class (e.g., CIRCLE is a base class of CIRCLE_FILL). A derived class may inherit the characteristics of several classes, that is, a derived class may have several base classes. This is referred to as multiple inheritance.

A derived class may specify that a base class is to be inherited virtually. Virtual inheritance of a base class means that only one instance of the virtual base class exists in the derived class. For example, the following is an example of a derived class with two nonvirtual base classes.

class CIRCLE_1: CIRCLE {...};
class CIRCLE_2: CIRCLE {...};
class PATTERN: CIRCLE_1, CIRCLE_2{...};

In this declaration class PATTERN inherits class CIRCLE twice nonvirtually through classes CIRCLE_1 and CIRCLE_2. There are two instances of class CIRCLE in class PATTERN.

The following is an example of a derived class with two virtual base classes.

class CIRCLE_1: virtual CIRCLE {...};
class CIRCLE_2: virtual CIRCLE {...};
class PATTERN: CIRCLE_1, CIRCLE_2{...};

The derived class PATTERN inherits class CIRCLE twice virtually through classes CIRCLE_1 and CIRCLE_2. Since the class CIRCLE is virtually inherited twice, there is only one object of class CIRCLE in the derived class PATTERN. One skilled in the art would appreciate virtual inheritance can be very useful when the class derivation is more complex.

A class may also specify whether its function members are virtual. Declaring that a function member is virtual means that the function can be overridden by a function of the same name and type in a derived class. In the following example, the function draw is declared to be virtual in classes CIRCLE and CIRCLE_FILL.

```
class CIRCLE
{   int x, y;
    int radius;
    virtual void draw();
};
class CIRCLE_FILL : CIRCLE
{   int pattern;
    virtual void draw();
};
```

The C++ language provides pointers data type. A pointer holds values that are addresses of objects in memory.

Through a pointer, an object can be referenced. The following statement declares variable c_ptr to be a pointer on an object of type class CIRCLE and sets variable c_ptr to hold the address of object c.

CIRCLE *c_ptr;

cptr=&c

Continuing with the example, the following statement declares object a to be of type class CIRCLE and object b to be of type class CIRCLE_FILL.

CIRCLE a;

CIRCLE_FILL b;

The following statement refers to the function draw as defined in class CIRCLE.

a.draw();

Whereas, the following statement refers to the function draw defined in class CIRCLE_FILL.

b.draw();

Moreover, the following statements type cast object b to an object of type class CIRCLE and invoke the function draw that is defined in class CIRCLE_FILL.

```
CIRCLE c;
CIRCLE *c_ptr;
c_ptr = &b;
c_ptr->draw( );     // CIRCLE FILL::draw( )
```

Thus, the virtual function that is called is function CIRCLE_FILL::draw.

The C++ language defines several kinds of functions that can be declared only as class members. These functions include constructors, which create objects, and destructors, which destroy objects. These functions can be called explicitly by the program or implicitly by the compiler. Constructors and destructors can be generated automatically by the compiler. In addition, a programmer can specify additional code that is executed by a constructor or destructor.

A constructor for a class is invoked whenever an object for that class is created. A constructor performs various tasks that are associated with building a class object. After memory for an object is allocated, a constructor initializes virtual base and virtual function related data, invokes base class and data member constructors in order of declaration, and executes programmer-specified code. A constructor has the same name as the class itself (e.g., CIRCLE::CIRCLE()).

Destructors perform the inverse function of the constructors. A destructor performs various tasks that are associated with destroying an object. Destructors execute programmer-specified code and invoke the destructors for base classes and data members in reverse order of declaration. After a destructor is executed, the memory for the object can then be deallocated. A destructor has the same name as the class itself, but with a tilde preceding it (e.g., CIRCLE::~CIRCLE()). Destructors are called when one of the following events occurs:

(1) An object that is created with the new operator is explicitly deallocated using the delete operator. When objects are deallocated using the delete operator, memory is freed for the "ultimately derived object," or the object that is a complete object, not an instance representing a base class.

(2) A local (automatic) object with block scope goes out of scope.

(3) The lifetime of a temporary object ends.

(4) A program ends and global or static objects exist.

(5) The destructor is explicitly called by the programmer.

If a base class or data member has an accessible destructor, and a derived class does not declare a destructor, the compiler generates one. This compiler-generated destructor invokes destructors for base classes and for data members of the derived class.

Memory that is allocated using the new operator is deallocated using the function operator delete. The compiler declares a global function operator delete. A programmer can declare other global function operator deletes. The programmer can also declare a static member function operator delete for a class. This member function operator delete is called when non-array instances of the class are to be deallocated after they are destroyed by the destructor. The function operator delete deallocates the memory of an object.

The following statements declare classes CIRCLE and CIRCLE_FILL with a constructor and destructor for each class. Class CIRCLE_FILL inherits class CIRCLE.

```
class CIRCLE
    {   int x, y;
        int radius;
        virtual void draw( );
        virtual void erase( );
        CIRCLE( )    {x=0; y=0; radius=1};
        virtual ~CIRCLE( )    {this->erase( )};
    }
class CIRCLE_FILL : CIRCLE
    {   int pattern;
        virtual void draw( );
        virtual void erase( );
        CIRCLE_FILL( )   {pattern=0}
        virtual ~CIRCLE_FILL( )   {this->erase( )};
```

The constructor and destructor for class CIRCLE are function members CIRCLE and ~CIRCLE, respectively. Constructor CIRCLE includes programmer-specified code to initialize the data members. When an object of type class CIRCLE is created, the constructor is invoked to initialize virtual function information and to execute programmer-specified code. Destructor ~CIRCLE includes programmer-specified code, which invokes the function erase that may perform clean-up tasks such as removing the circle from the display. When an object of type class CIRCLE is destroyed, the programmer-specified code is executed.

The constructor and destructor for class CIRCLE_FILL are function members CIRCLE_FILL and ~CIRCLE_FILL, respectively. Constructor CIRCLE_FILL includes programmer-specified code to initialize the data member. When an object of type class CIRCLE_FILL is created, the constructor is invoked to invoke the constructor for class CIRCLE, to initialize virtual function data, and to execute programmer-specified code. Destructor ~CIRCLE_FILL includes programmer-specified code that invokes function erase, which may perform clean-up tasks such as removing the circle from the display. When an object of type class CIRCLE_FILL is destroyed, the programmer-specified code is executed and the destructor for class CIRCLE is invoked.

FIG. 2 is an overall flow diagram of a destructor generated by a typical prior compiler. The destructor receives three parameters when invoked. The first parameter indicates whether the object being destroyed is for an ultimately derived object. The second parameter indicates whether the destructor is being invoked for a single object or for an array (vector) of objects. The third parameter indicates whether the object memory is to be deallocated. In step 201, the destructor executes any programmer-specified code. Steps 202 through 208 are generated automatically by the compiler as needed. In step 202, the destructor invokes the destructors for the data members. When these data member destructors are invoked, the parameters indicate that the object is not ultimately derived and that memory is not to be deallocated. In step 203, the destructor invokes the destructors for each nonvirtual direct base class in the reverse order in which the base class names are declared. When these base class destructors are invoked, the parameters indicate that the object is not ultimately derived and that memory is not to be deallocated. In step 204, if the destructor is called for an object of an ultimately derived object, then the destructor continues at step 205, else the destructor returns. In step 205, the destructor invokes each of the destructors for virtual base classes in the reverse order of their appearance in a depth-first left-to-right traversal of the inheritance tree (see Detailed Description of the Invention). In step 206, if a vector of objects is indicated and not all of the objects have been processed, then the destructor loops to step 201 to process the next object in the vector, else the destructor continues at step 207. In step 207, if memory is to be deallocated for the object or vector of objects, then the destructor continues at step 208, else the destructor returns. In step 208, the destructor deallocates the memory and returns.

The following statements are used to further illustrate the methods of prior compilers for implementing destructors. The following statements declare classes X, V, A, B, and C.

```
class X
{   int mx1;
    int mx2;
    virtual ~X( ){...};
};
class V
{   int mv1;
    int mv2;
    virtual ~V( ){...};
};
class A : virtual V
{   int ma1;
    int ma2;
    virtual ~A( ){...};
};
class B : A
{   int mb1;
    int mb2;
    void operator delete (void*);
};
class C : B, virtual V
{   X   mc1;
    int mc2;
    int mc3;
    virtual ~C( ){...};
    void operator delete (void*);
}
```

FIGS. 3 through 6 are flow diagrams of typical destructors generated by prior compilers for classes. These diagrams correspond to the overall structure of the diagram in FIG. 2.

FIG. 3 is a flow diagram of a destructor for class V. Class V inherits no base classes and has no data members with destructors. Class V has a programmer-declared virtual destructor ~V. In step 301, the destructor executes the programmer-specified code for destructor ~V. Steps 302 and 303 are shown in dashed lines to indicate that a .compiler generates no code to invoke destructors for direct nonvirtual base classes and data members because class V has no data members with destructors and no nonvirtual direct base classes. In step 304, if the V object is ultimately derived, then the destructor continues at step 305, else the destructor returns. Step 305 is shown in dashed lines to indicate that the compiler generates no code to invoke destructors for virtual base classes because class V has no virtual base classes. In step 306, if the destructor is invoked for a vector of V objects and not all the objects have been processed, then the destructor loops to step 301 to process the next object, else the destructor continues at step 307. In step 307, if the memory is to be deallocated for the V object or vector of V objects, then the destructor continues at step 308, else the destructor returns. In step 308, the destructor deallocates the memory for the V object or vector of V objects and returns.

Since the declaration of class X is analogous to the declaration of class V, the destructor for class X is also analogous and is not described in detail.

FIG. 4 is a flow diagram of the destructor for class A. Class A virtually inherits class V and has no data members with destructors. Class A has a programmer declared virtual destructor ~A, which overrides the destructor for class V. In step 401, the destructor executes the programmer specified code for destructor ~A. Steps 402 and 403 are shown in dashed lines to indicate that a compiler generates no code to invoke nonvirtual base class and data member destructors because class A has no data members with destructors and no nonvirtual direct base classes. In step 404, if the A object is ultimately derived, then the destructor continues at step 405, else the destructor returns. In step 405, the destructor invokes the destructor for the virtual base class V, passing a parameter indicating that it is not being invoked for an ultimately derived V object. In step 406, if the destructor is invoked for a vector of A objects and not all the objects have been processed, then the destructor loops to step 401 to process the next object, else the destructor continues at step 407. In step 407, if the memory is to be deallocated for the A object or vector of A objects, then the destructor continues at step 408, else the destructor returns. In step 408, the destructor deallocates the memory for the A object or vector of A objects and returns.

FIG. 5 is a flow diagram of the destructor for class B. Class B inherits class A, has no data members with destructors, and has no programmer-declared destructor. Even though class B has no programmer-declared destructor, the compiler generates the destructor as shown in FIG. 5. Since a base class has a virtual destructor, the compiler-generated destructor ~B is also virtual. Steps 501 and 502 are shown in dashed lines to indicate that there is no programmer-specified code to execute, and that there are no data members with destructors. In step 503, the destructor invokes the destructor for the nonvirtual direct base class A, passing a parameter indicating that it is not being invoked for an ultimately derived A object. In step 504, if the B object is ultimately derived, then the destructor continues at step 505, else the destructor returns. In step 505, the destructor invokes the destructor for the virtual base class V, passing a parameter indicating that it is not being invoked for an ultimately derived V object. In step 506, if the destructor is invoked for a vector of B objects and not all the objects have been processed, then the destructor loops to steps 501 to process the next object, else the destructor continues at step 507. In step 507, if the memory is to be deallocated for the B object or vector of B objects, then the destructor continues at step 508, else the destructor returns. In step 508, the destructor deallocates the memory for the B object or vector of B objects and returns.

FIG. 6 is a flow diagram for a destructor of class C. Class C inherits class B and virtually inherits class V, has data member X with a destructor, and has programmer-declared destructor ~C. In step 601, the destructor executes the programmer-specified code for destructor ~C. In step 602, the destructor invokes the destructor for class X, passing a parameter indicating that the object is an ultimately derived object, but that memory is not to be deallocated. In step 603, the destructor invokes the destructor for the nonvirtual direct base class B, passing a parameter indicating that it is not being invoked for an ultimately derived X object. In step 604, if the destructor is being invoked for an ultimately derived object, then the destructor continues at step 605, else the destructor returns. In step 605, the destructor invokes the destructor for the virtually inherited base class V, passing a parameter indicating that is not being invoked for an ultimately derived V object. In step 606, if the destructor is invoked for a vector of V objects and not all the objects have been processed, then the destructor loops to steps 601 to process the next object, else the destructor continues at step 607. In step 607, if the memory is to be deallocated for the V object or vector of V objects, then the destructor continues at step 608, else the destructor returns. In step 608, the destructor deallocates the memory for the V object or vector of V objects and returns.

SUMMARY OF THE INVENTION

It is an object of the present invention to provide a method and system for reducing the execution time of the destruction process for objects in an object-oriented environment.

It is another object of the present invention to provide a method and system for reducing the size of code generated to destroy objects in an object-oriented programming language.

It is another object of the present invention to provide a method and system for ensuring the appropriate function operator delete is invoked to deallocate memory.

It is another object of the present invention to provide a method and system for ensuring that polymorphic array destruction occurs correctly.

These and other objects, which will be apparent as the invention is more fully described below, are provided by a method and system for generating code to destroy objects. In a preferred embodiment, a compiler generates a plurality of destructor functions for the class. Each destructor function performs a subset of the destruction process. The compiler generates code to invoke one of the plurality of destructor functions to destroy an object of the class. In a preferred embodiment, destructor functions are generated to destroy an object that is not ultimately derived to destroy an object that is ultimately derived (i.e., the object when the class is a most-derived class for the object), to destroy an object that is ultimately derived and to deallocate the object memory, to destroy an array of objects, and to destroy an array of objects and to deallocate the memory of the array.

DETAILED DESCRIPTION OF THE INVENTION

Figure 1:
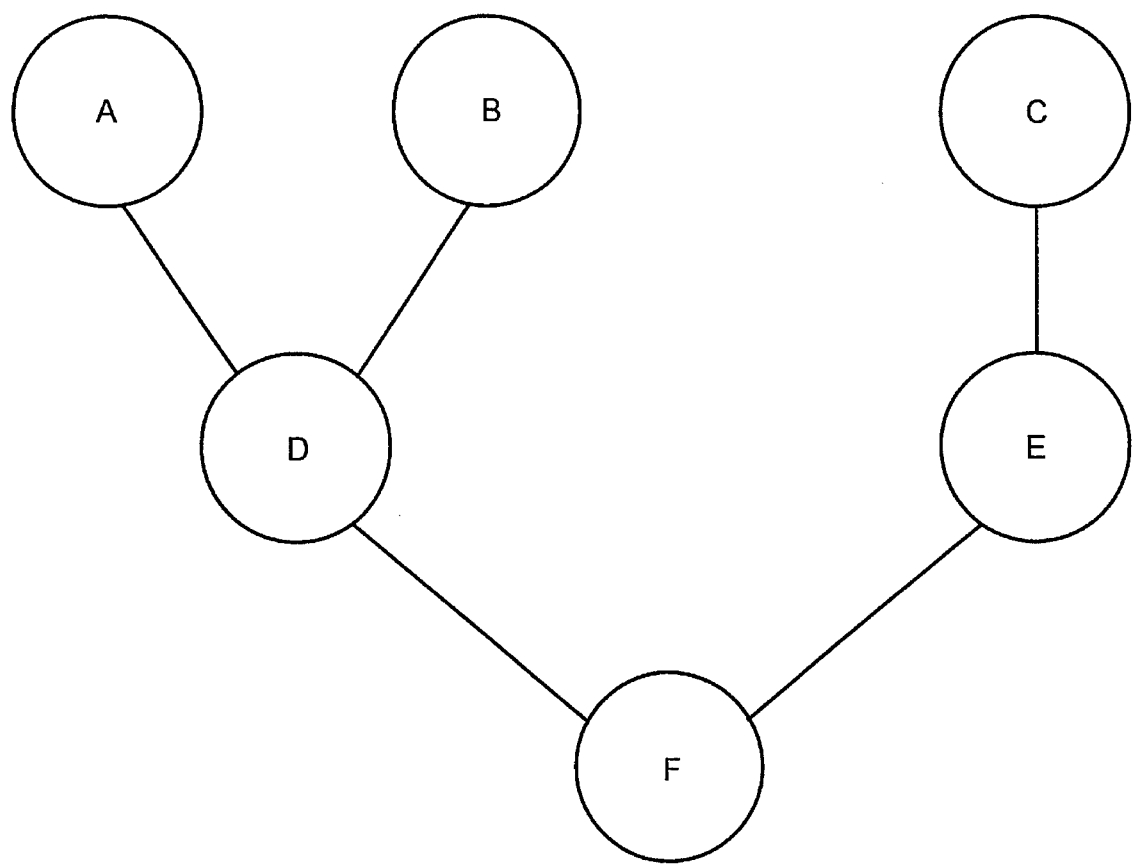
FIG. 1 shows the inheritance tree for a typical class.

The present invention provides an improved method and system for implementing destructors in a compiler for an object-oriented programming language. A preferred embodiment of the present invention is C++ compiler that implements destructors as described herein. Although the present invention is described in terms of a compiler for the C++ programming language, one skilled in the art would know that the methods of the present invention are applicable to other programming languages that support destructors. The present invention provides for a method of implementing destructors that provide improvements in both execution speed and size of generated code.

In a preferred embodiment of the present invention, various destructor functions for a class are generated by the compiler, rather than one destructor function as generated by prior compilers. Each destructor function is defined to perform a subset of the destruction process. In a preferred embodiment, one destructor function performs the processing to destroy an object that is not ultimately derived. A second destructor function performs the processing to destroy an object that is ultimately derived. A third destructor function performs the processing to destroy an object that is ultimately derived and to deallocate the memory for the object. A fourth destructor function performs the processing to destroy a vector of objects, which are ultimately derived. A fifth destructor function performs the processing to destroy a vector of objects, which are ultimately derived, and to deallocate the memory for the objects. The compiler generates calls to each of these destructor functions as needed to destroy an object as described below. Furthermore, the compiler generates only those destructor functions that are actually needed by the program being compiled.

In a preferred embodiment, the compiler defines a data structure for each class. If a class declares a base class to be virtual, then the compiler allocates a virtual base table for the class. If a class introduces a virtual function, then the compiler allocates a virtual function table for the class. The class data structure contains the layout of the data members and internal pointers. The internal pointers are virtual base table pointers and virtual function table pointers. These pointers are initialized during run time to point to the virtual base table and virtual function table associated with the class. During compile time, the compiler initializes the virtual function tables with pointers corresponding to virtual functions and initializes the virtual base tables with offsets into the class data structure corresponding to the location of virtually inherited classes.

In a preferred embodiment, the techniques for generating an object data structure layout are described in U.S. patent application Ser. No. 07/682,537, entitled "A Method for Implementing Virtual Functions and Virtual Bases in a Compiler for an Object-Oriented Programming Language," which is hereby incorporated by reference.

Class Data Structures

The compiler defines a data structure for each class. The data structure specifies the run-time storage allocation for each instance of the class. The data structure contains allocations for the data members of the class and for internal pointers used to implement virtual functions and virtual classes. The data structure for a derived class also contains the data structure for each base class. The data structure of a base class within a derived class is referred to as an occurrence of the base class within the derived class.

The class data structure for a primary class that has no virtual function members consists of the data members allocated in order of appearance in the class declaration. In a preferred embodiment, the data members in any data structure have the same alignment characteristics as the C++ struct data type.

The class data structure for a primary class that has a virtual function member consists of a virtual function table pointer followed by the data members allocated in order of appearance in the declaration.

The data structure for a derived class varies depending on the characteristics of the derived class and the base classes. In a preferred embodiment, the data structure for a derived class consists of:

(1) a virtual function table pointer, if the derived class defines a virtual function member that is not defined in a base class and if there is no nonvirtual base class that has a virtual function table associated with it, (2) a virtual base table pointer, if there is a virtual base class and if there is no nonvirtual base class that has a virtual base table pointer associated with that nonvirtual base class, (3) an occurrence of each nonvirtual base class in the left-to-right order specified in the list of base classes in the declaration, (4) the data members declared in the derived class allocated in order of appearance in the declaration, and (5) an occurrence of each virtual base class in the order as visited in a depth-first, left-to-right traversal of the inheritance tree (described below) of the derived class.

One skilled in the art would appreciate that the ordering of the components (2), (3), and (4) of a data structure can be interchanged.

A derived class is a direct descendant of the base classes listed in the declaration. Conversely, the base classes listed in the declaration are direct ancestors of a derived class. An inheritance tree is the ancestral relationship of the direct and indirect ancestors of a class. FIG. 1 shows the inheritance tree for class F. Class F and its ancestor classes are defined below.

class A{. . .};

class B{. . .};

class C{. . .};

class D: A, B{. . .};

class E: C {. . .};

class F: D, E{. . .};

Class F directly descends from base classes D and E and indirectly descends from classes A, B, and C. Classes A, B, C, D, and E are base classes of class F. Classes D and E are direct base classes of class F. Classes A, B, and C are indirect base classes of class F. A depth-first, left-to-right traversal of this inheritance tree would visit the nodes in the following order: F, D, A, B, E, C. One skilled in the art would recognize that this traversal is a preorder traversal of the inheritance tree defined by the following recursive procedure.

```
Preorder_Traversal(Tree)
begin
    visit root of Tree
    for each direct ancestor of Tree in left-
        to-right order
    SubTree = the tree rooted at the direct
        ancestor
    call Preorder_Traversal(SubTree)
end
```

Although preferred embodiments use a depth-first, left-to-right traversal of the inheritance tree, one skilled in the art would appreciate that other methods of traversing the inheritance tree may be used. Similarly, preferred embodiments scan the direct base class list in a left-to-right ordering. However, other orderings may be used.

Virtual Function Table

A virtual function table for a class contains addresses corresponding to the virtual function members associated with that class. The virtual function table is used at run time to invoke the virtual functions indirectly. Each primary class with a virtual function member has an associated virtual function table. The virtual function table contains the addresses of each virtual function member in order of declaration. The class data structure for such a class contains a virtual function table pointer (vfptr). When memory for a class data structure is allocated at run time (during construction), the virtual function table pointer is initialized with the address of the associated virtual function table. Thus, all objects of certain class type point to the same virtual function table. To implement the invoking of a virtual function, the compiler generates code to access the virtual function member through the virtual function table.

A derived class inherits a copy of the virtual function tables associated with its direct base classes. Also, a derived class that introduces a virtual function member either has an additional virtual function table or shares one of the inherited virtual function tables. A class is said to "introduce" a virtual function member if there are no other virtual function members of the same name and type in a base class. Such a derived class shares the virtual function table with the first nonvirtual base class with an associated virtual function table that is visited in a depth-first, left-to-right traversal of the inheritance tree, if such a base class exists. Otherwise, the derived class has its own virtual function table. The derived class shares a virtual function table by appending the entries for the function members introduced in the derived class to the shared virtual function table.

In a preferred embodiment, the compiler generates code to invoke virtual functions indirectly through the virtual function table associated with the invoking object.

Virtual Base Tables

A virtual base table contains, for each virtual direct base class, the offset between the address of the derived class and the address of the occurrence of the virtual direct base class in the derived class. The address of a class is described below. The virtual base tables are used at run time to access the occurrences of the virtual base classes.

The data structure for a derived class with an associated virtual direct base class includes a virtual base table pointer. Such a derived class shares the virtual base table pointer with the first nonvirtual base class with an associated virtual base table that is visited in a depth-first, left-to-right traversal of the inheritance tree, if such a base class exists. The sharing of a virtual base table pointer means that the derived class and the base class share the same virtual base table. When a virtual base table is shared, the virtual base table is extended to include the offsets of the occurrences for the virtual direct base classes in the derived class that are not inherited by the base class whose virtual base table pointer is being shared. All functions that access the data members of a virtual base class access the data member through a virtual base table.

The entries in a virtual base table are ordered according to a left-to-right ordering of the virtual base classes in the declaration of the derived class.

Class Address

The address of an instance of a class is the address of the virtual function table pointer, if the class has one or shares one. Otherwise, the address of an instance of a class is the address of the virtual base table pointer, if the class has one or shares one. Otherwise, the address of an instance of a class is the address of the occurrence of the left-most nonvirtual direct base class in the declaration, if there is such a base class. Otherwise, the address of an instance of a class is the address of the first data member in the class.

This Pointer

In the C++ language, the "this" pointer points to the object for which a function is called. The word "this" is a reserved word in the C++ language. In a preferred embodiment, the this pointer is passed to the function as hidden argument.

For nonvirtual function members, the this pointer is the address of the object associated with the call.

For virtual function members, the this pointer is the address of the occurrence of the introducing class in the object associated with the call. A function defined in the introducing class expects that it is passed such a this pointer value. If the function is overridden, the overriding function may logically adjust the this pointer by the offset between the address of the object and the address of the occurrence of the introducing class within the object. This logical adjustment allows the overriding function to access the entire object of the class in which the overriding function is declared. In a preferred embodiment, explicit adjustment of the address may not be necessary because the offset can usually be incorporated into another computation or address formation.

Because an overriding function can be shared by many occurrences of a class or many different classes, there are two cases in which the this pointer needs to be adjusted before a function is invoked. In these cases, adjustor routines (i.e., thunks) are used to adjust the this pointer value before the function is invoked.

The first case occurs when a function member in a derived class overrides a function member that is defined in more than one base class, including when a class that defines the function occurs more than once in the inheritance tree. In this case, the overriding function is compiled expecting that the this pointer is set to the address of the "introducing class." The "introducing class" for a function is the first class visited in a depth-first, left-to-right traversal of the inheritance tree that introduces the function. For each class, except the introducing class, in which the function is overridden, an adjustor is created. The adjustor modifies the this pointer and then invokes the overriding function. The adjustor modifies the this pointer by the offset between the address of the occurrence of the introducing class and the address of the occurrence of the class for which the function is invoked. To override the address of the virtual function, the address of the adjustor is placed in the virtual function table corresponding to the occurrence of the class in which the function is defined. Thus, when the overriding function is invoked for an occurrence of a class for which an adjustor is created, the compiled program retrieves the address of the adjustor from the virtual function table and calls the adjustor. The adjustor then adjusts the this pointer and jumps to the overriding function. The virtual function table of the occurrence of the introducing class within the derived class contains the address of the overriding function, no adjustor is needed.

The second case occurs when a derived class has a base class that overrides a function member in a virtual base class and the derived class itself does not override the function member. In this case, the overriding function is compiled to expect the this pointer to be set to the address of the introducing class, the virtual class. To access an object for the class that virtually inherits the introducing class, the overriding function logically adjusts the this pointer by the offset of the occurrence of the introducing class and the address of the object. For the class that virtually inherits the introducing class, the address of the overriding function is placed in the virtual function table associated with the virtually inherited class. However, when such a class is itself used as a base class, the offset between occurrence of the virtual base class and the occurrence of the base class in the derived class may be different than the offset that the overriding function expects. In such case, an adjustor is used for the overriding function. The adjustor adjusts the this pointer to account for the difference between the offsets. The address of the adjustor is placed in the virtual function table associated with occurrence of the virtual class in the derived class. Thus, when the overriding function is called for an object of the derived class, the adjustor is invoked. The adjustor adjusts the this pointer by the difference in the offsets so that the overriding function correctly computes the address of the introducing class. The adjustor then invokes the overriding function.

Generating Destructors

Figure 2:
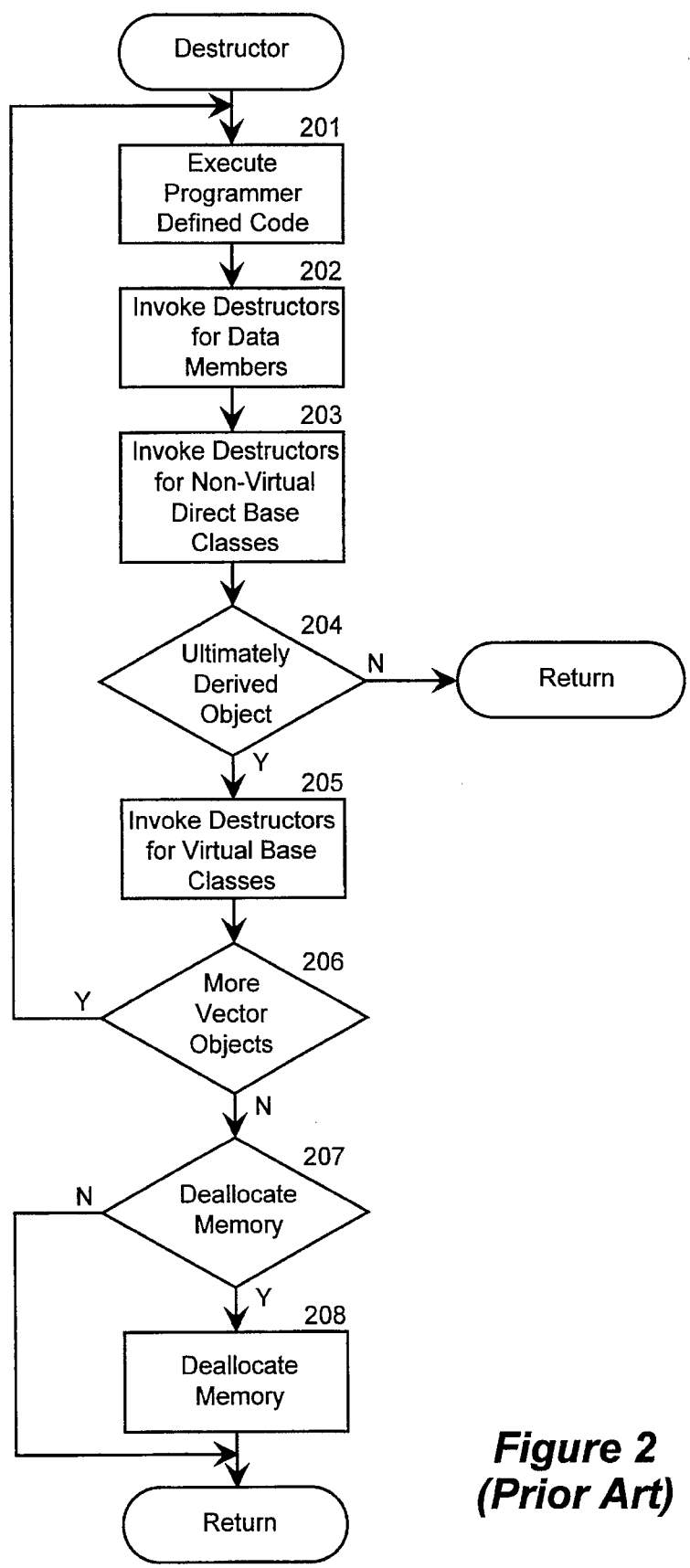
FIG. 2 is an overall flow diagram of a destructor generated by a typical prior compiler.
Figure 3:
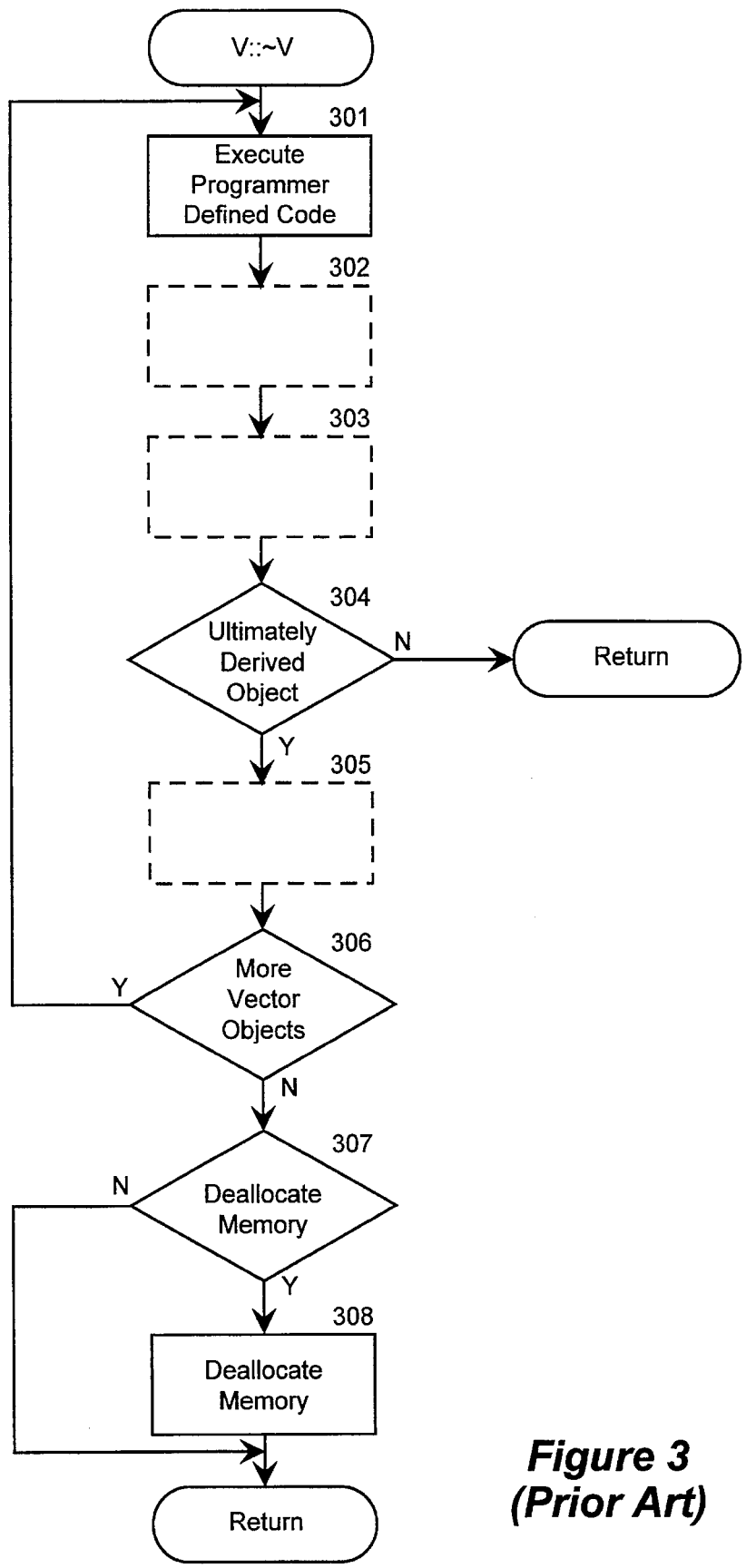
FIGS. 3 through 6 are flow diagrams of destructors generated by a typical prior compiler.
Figure 4:
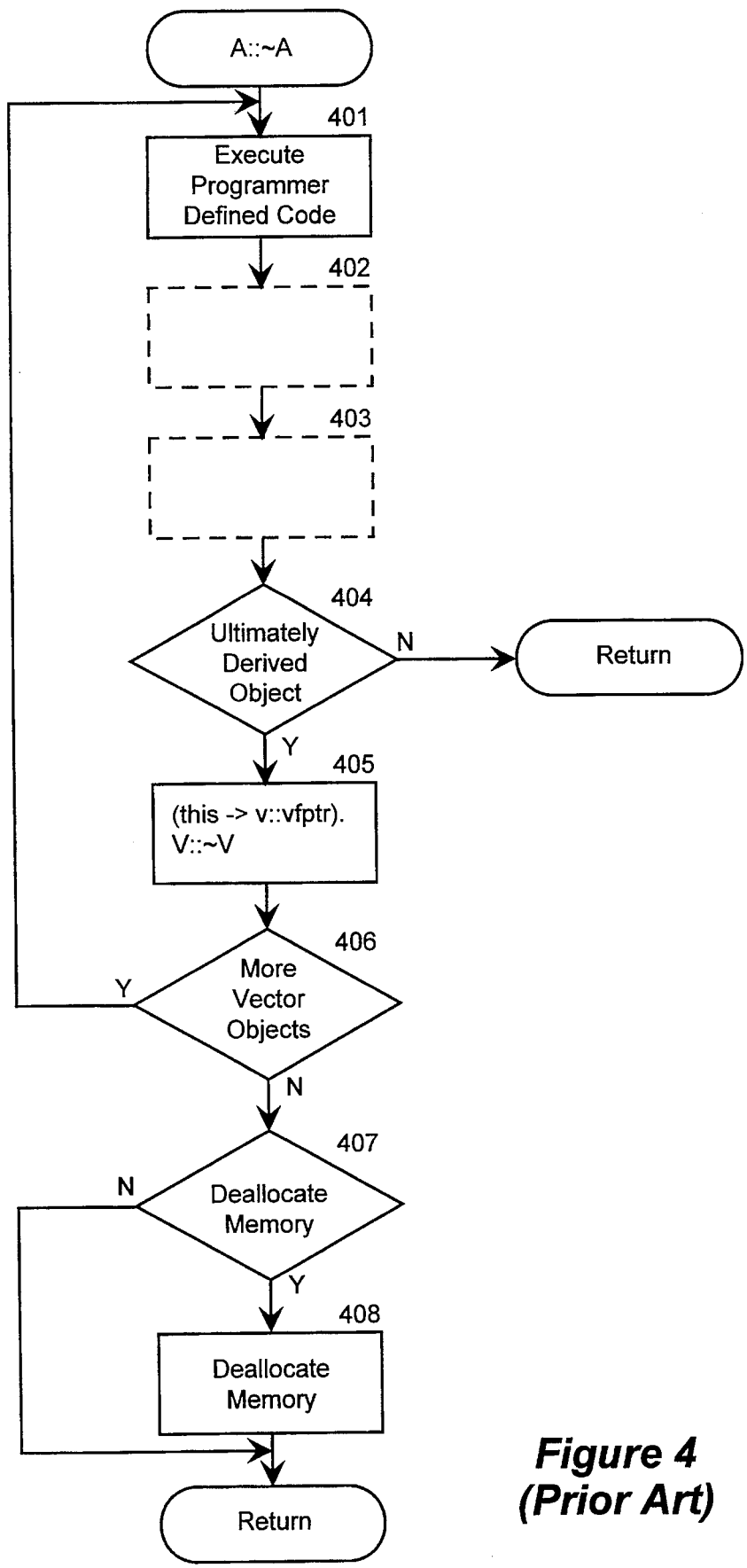
Figure 5:
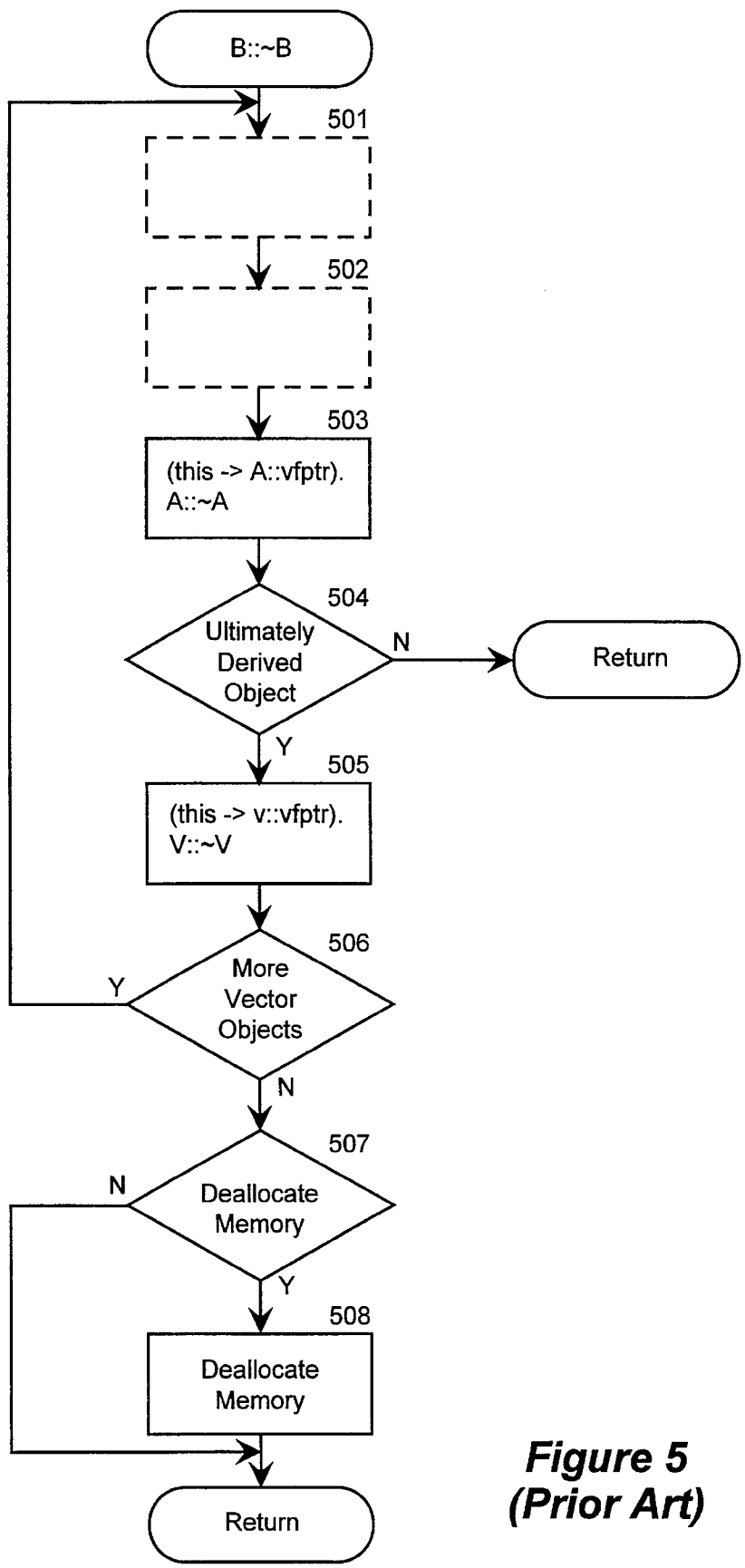
Figure 6:
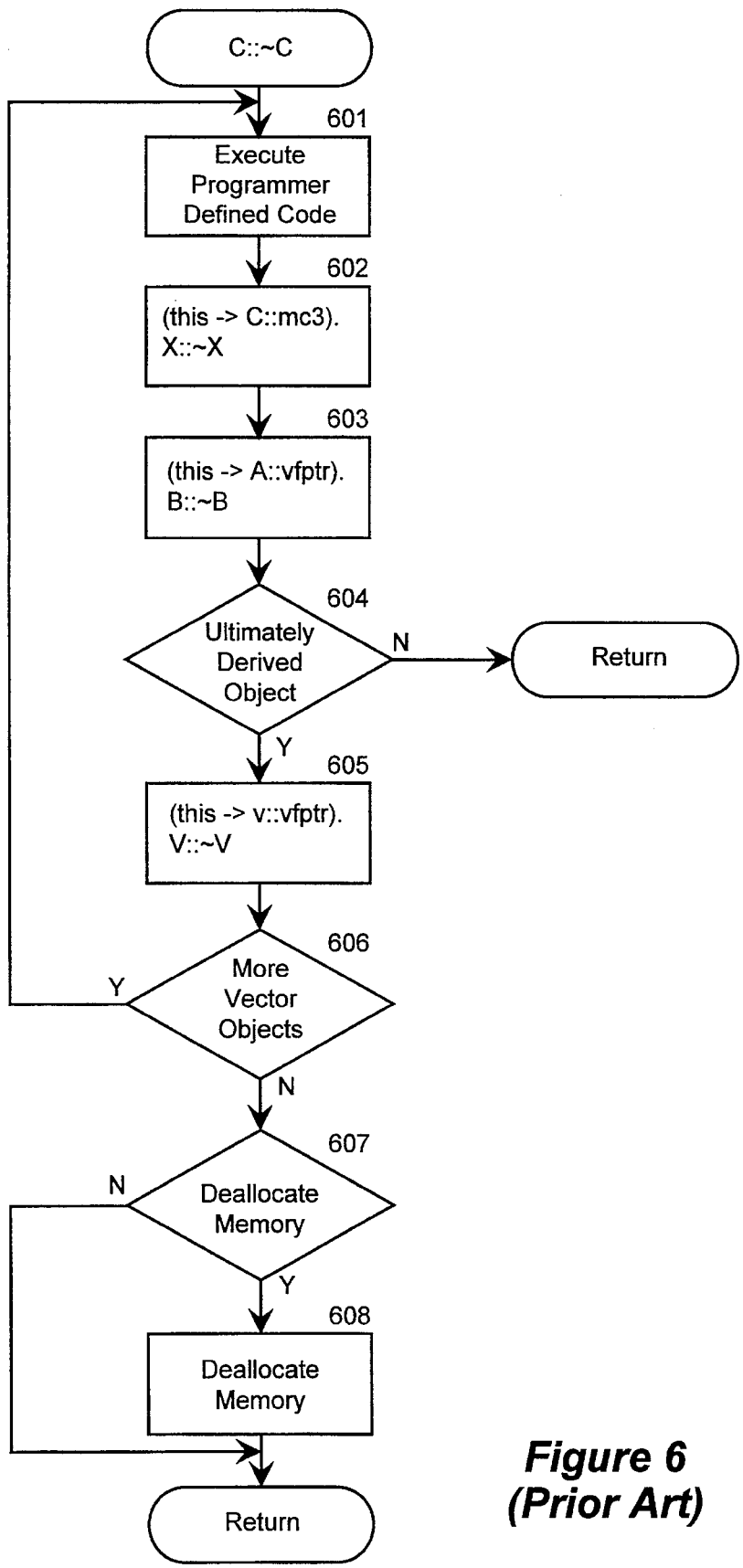
Figure 7:
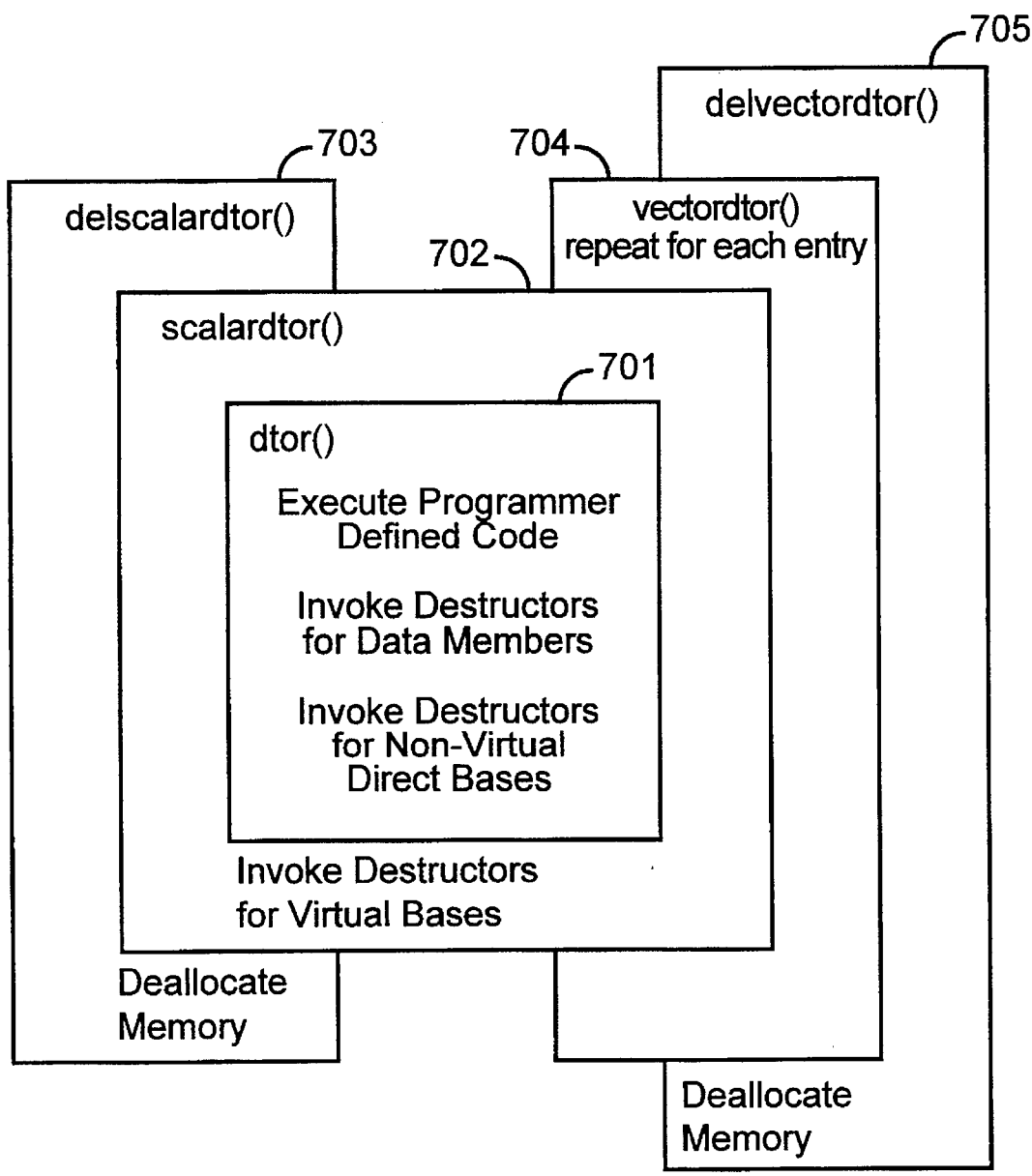
FIG. 7 is a diagram illustrating the layered functions of a destructor.

In a preferred embodiment of the present invention, a compiler uses a layered approach to implement destructors. Compilers implementing the methods of the present invention generate nested (layered) functions to invoke when destroying objects. In a preferred embodiment, the compiler generates up to five functions to implement a destructor. FIG. 7 is a diagram illustrating the layered functions of a destructor. Block 701 represents the code for function dtor. (The letters "dtor" are short for destructor.) The function dtor performs the steps of the destruction process that are needed for an object that is not ultimately derived. These steps are executing programmer-specified code, invoking destructors for data members, and invoking destructors for nonvirtual base classes. These steps correspond to steps 201, 202 and 203 of destructors generated by prior compilers as shown in FIG. 2. Block 702 represents the code for function scalardtor. As the name suggests, the function scalardtor performs the steps of the destruction process that are needed for a single ultimately derived object. The function scalardtor invokes function dtor and invokes the destructors for the virtual base classes. The invoking of the destructors for the virtual base classes corresponds to step 205 of destructors generated by prior compilers as shown in FIG. 2. If a class has no virtual base classes, then the function scalardtor only invokes function dtor. Thus, when a compiler generates code for an ultimately derived object of a class with no virtual base classes, the compiler preferably generates no code for the function scalardtor and invokes function dtor directly. Block 703 represents the code for function delscalardtor. Function delscalardtor performs the steps of the destruction and deallocation process that are needed for a single ultimately derived object. The function delscalardtor invokes the function scalardtor and deallocates the memory for the object. The deallocation of the memory corresponds to step 208 of destructors generated by prior compilers as shown in FIG. 2. Block 704 represents the code for function vectordtor. Function vectordtor performs the steps of the destruction process that are needed for a vector of ultimately derived objects. The function vectordtor invokes the function scalardtor for each object in the vector. In a preferred embodiment, a compiler does not generate code for the function vectordtor for each class for which an array of objects is defined and does not generate calls to the function vectordtor. Rather, the compiler generates a helper function that is used by all classes and invokes the helper function to destroy an array of objects. The helper function takes four parameters: (1) the address of the array, (2) the number of elements in the array, (3) the size of the elements, and (4) the address of a function scalardtor. The helper function invokes the passed function scalardtor for each element in the passed array. Block 705 represents the code for function delvectordtor. Function delvectordtor performs the step of the destruction and deallocation process that are needed for a vector of ultimately derived objects.

Figure 8:
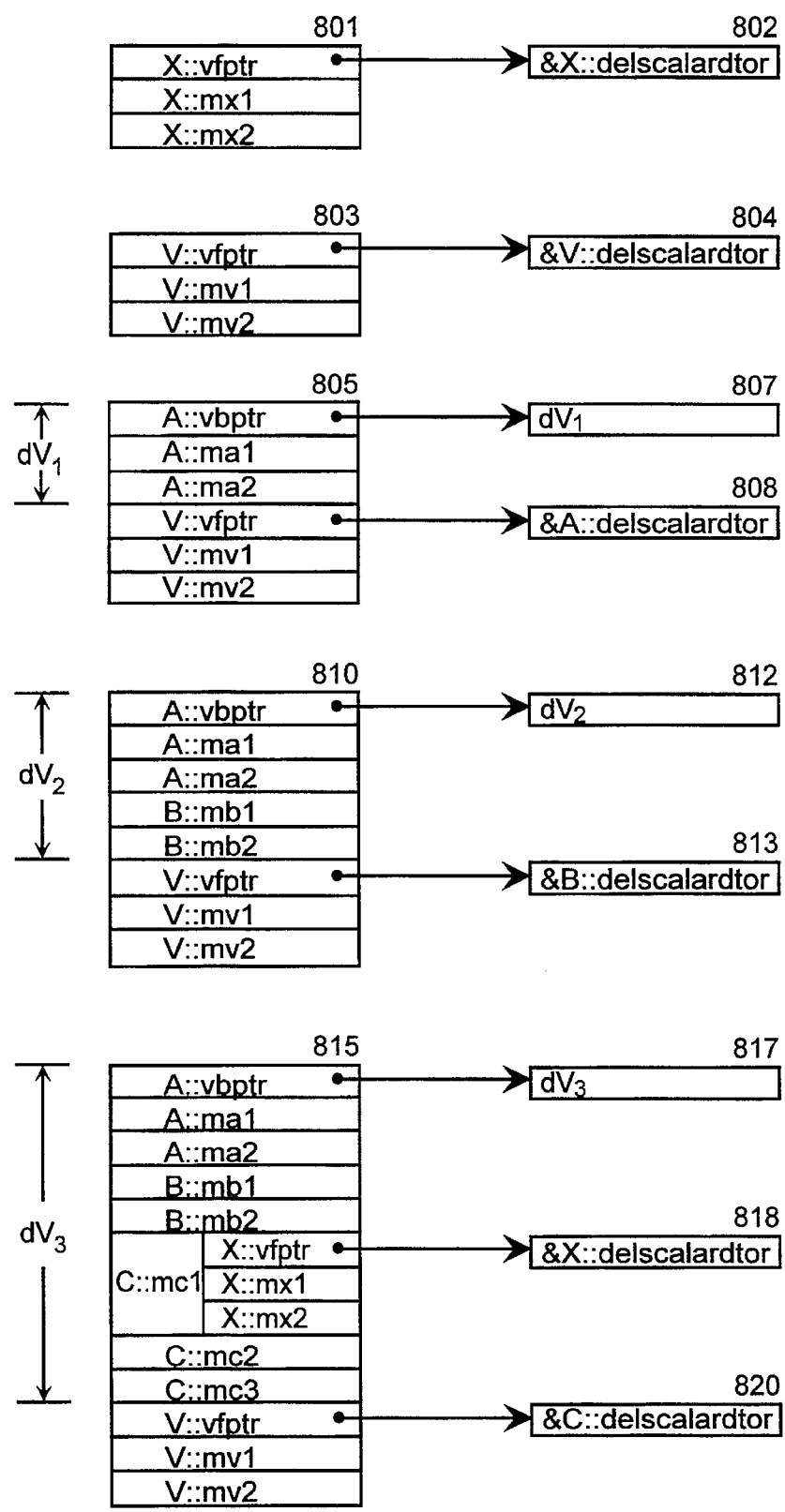
FIG. 8 is a schematic diagram of the data structures for sample classes in a preferred embodiment.

Referring again to classes X, V, A, B, and C as declared in the Background of the Invention, FIG. 8 is a schematic diagram of the data structures for those classes in a preferred embodiment. Data structure 801 represents the data structure for class X. Data structure 801 contains the virtual function table pointer X::vfptr and data members X::mx1 and X::mx2 of class X. The virtual function table pointer X::vfptr points to virtual function table 802. Virtual function table 802 contains one entry containing the address of function X::delscalardtor. Data structure 803 represents the data structure for class V. Data structure 803 contains virtual function table pointer V::vfptr and data members V::mv1 and V::mv2. The virtual function table pointer V::vfptr points to the virtual function table 804. Virtual function table 804 contains the address of function V::delscalardtor. Data structure 805 represents the data structure for class A. Data structure 805 contains data members A::ma1 and A::ma2, the virtual base table pointer A::vbptr, and an occurrence of class V. Virtual base table pointer A::vbptr points to virtual base table 807. Virtual base table 807 contains offset $dV_1$, which contains the offset from the virtual base table pointer A::vbptr to the occurrence of class V within an object of class A. Virtual function table pointer V::vfptr contains the address of virtual function table 808, which contains one entry with the address of function A::delscalardtor. Data structure 810 represents an object of class B. Data structure 810 contains an instance of class A, data members B::mb1 and B::mb2, and an instance of class V. The virtual base pointer A::vbptr points to the virtual base table 812. Virtual base table 812 contains the offset from the virtual base pointer to the occurrence of class V within an object of class B. The virtual function pointer V::vfptr points to virtual function table 813. Virtual function table 813 contains the address of function B::delscalardtor. Data structure 815 represents an object of class C. Data structure 815 includes an occurrence of class B, data members C::mc1, C::mc2, and C::mc3, and an occurrence of class V. Data member C::mc1 is an occurrence of class X. Virtual base table A::vbptr points to virtual base table 817, which contains the offset from the virtual base table pointer A::vbptr to the occurrence of class V within an object of class C. Virtual function table pointer X::vfptr of member C::mc1 points to virtual function table 818, which contains the address of function X::delscalardtor. Virtual function table pointer V::vfptr points to virtual function table 820. Virtual function table 820 contains the address of function C::delscalardtor.

Figure 9:
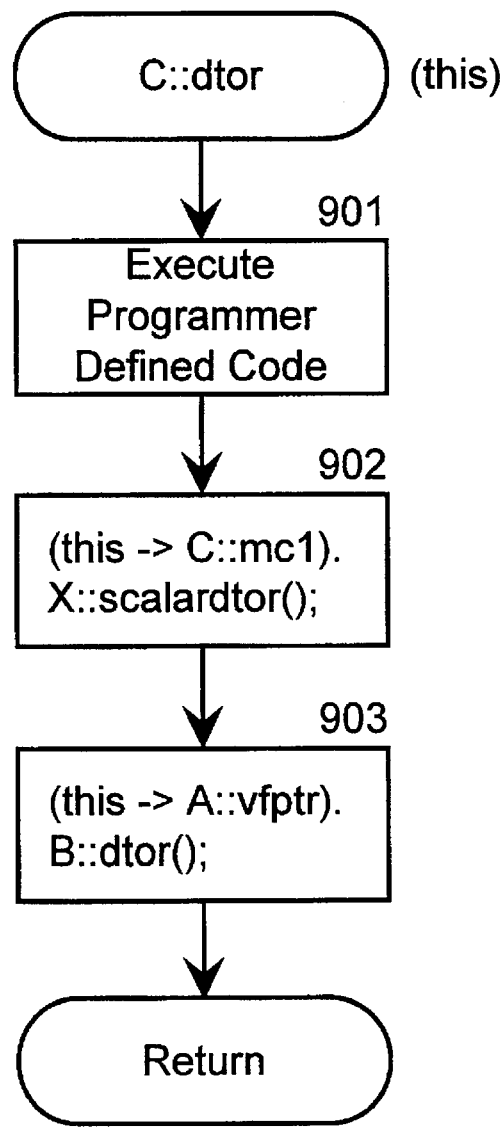
FIGS. 9 through 17 are flow diagrams of destructor functions in a preferred embodiment.

FIGS. 9 through 13 are flow diagrams of the five layered destruction functions for class C in a preferred embodiment. FIG. 9 is a flow diagram of function C::dtor. In step 901, function C::dtor executes the programmer-specified code. In step 902, function C::dtor invokes the function X::scalardtor to destroy data member C::mc1. The function X::scalardtor is invoked, rather function X::dtor, because data members that are class objects are treated as ultimately derived objects. Thus, if class X had a virtual base class, then function X::scalardtor would invoke the destructors for the virtual base class. In step 903, function C::dtor invokes function B::dtor to destroy the occurrence of nonvirtual direct base class B within class C. The function then returns.

Figure 10:
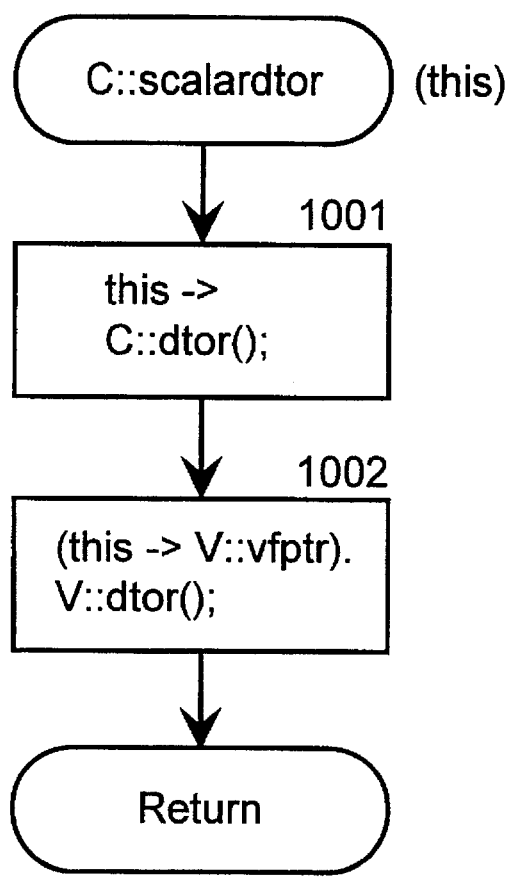

FIG. 10 is a flow diagram of function C::scalardtor. In step 1001, function C::scalardtor invokes function C::dtor for the object to be destroyed. In step 1002, function C::scalardtor invokes function V::dtor to destroy the occurrence of class V within class C, and the routine returns.

Figure 11:
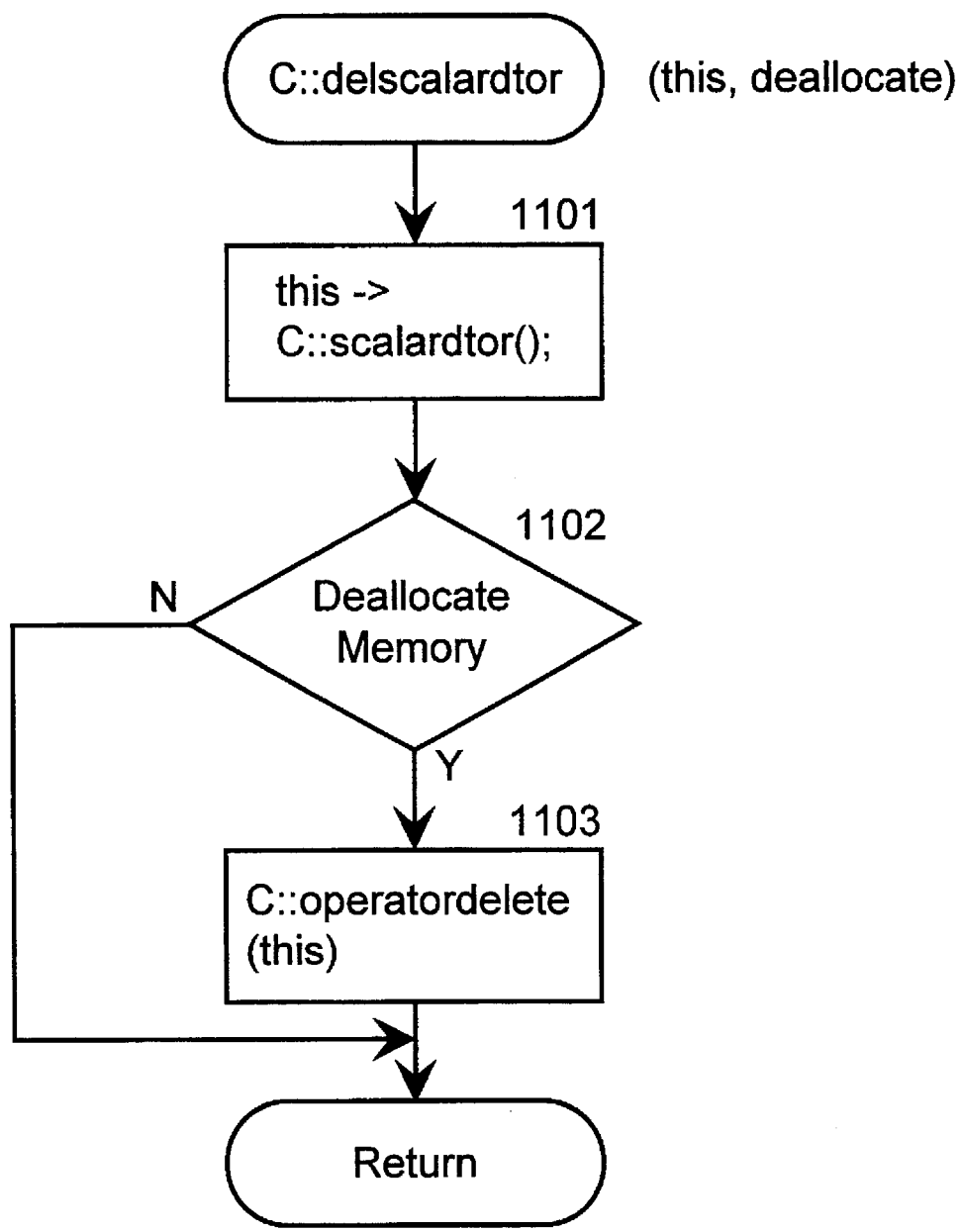

FIG. 11 is a flow diagram of function C::delscalardtor. This function is passed a parameter to indicate whether memory is to be deallocated by the class member function operator delete. In step 1101, the function C::delscalardtor invokes function C::scalardtor for the object to be destroyed. In step 1102, if the memory for the C object is to be deallocated, then the function C::delscalardtor continues at step 1103, else the function C::delscalardtor returns. In step 1103, the function C::delscalardtor deallocates the memory for the C object by invoking the function operator delete for the class and returns. In a preferred embodiment, the function C::delscalardtor returns an address for the object that can be passed to the global function operator delete to deallocate memory in the event a class member function operator delete is not defined.

Figure 12:
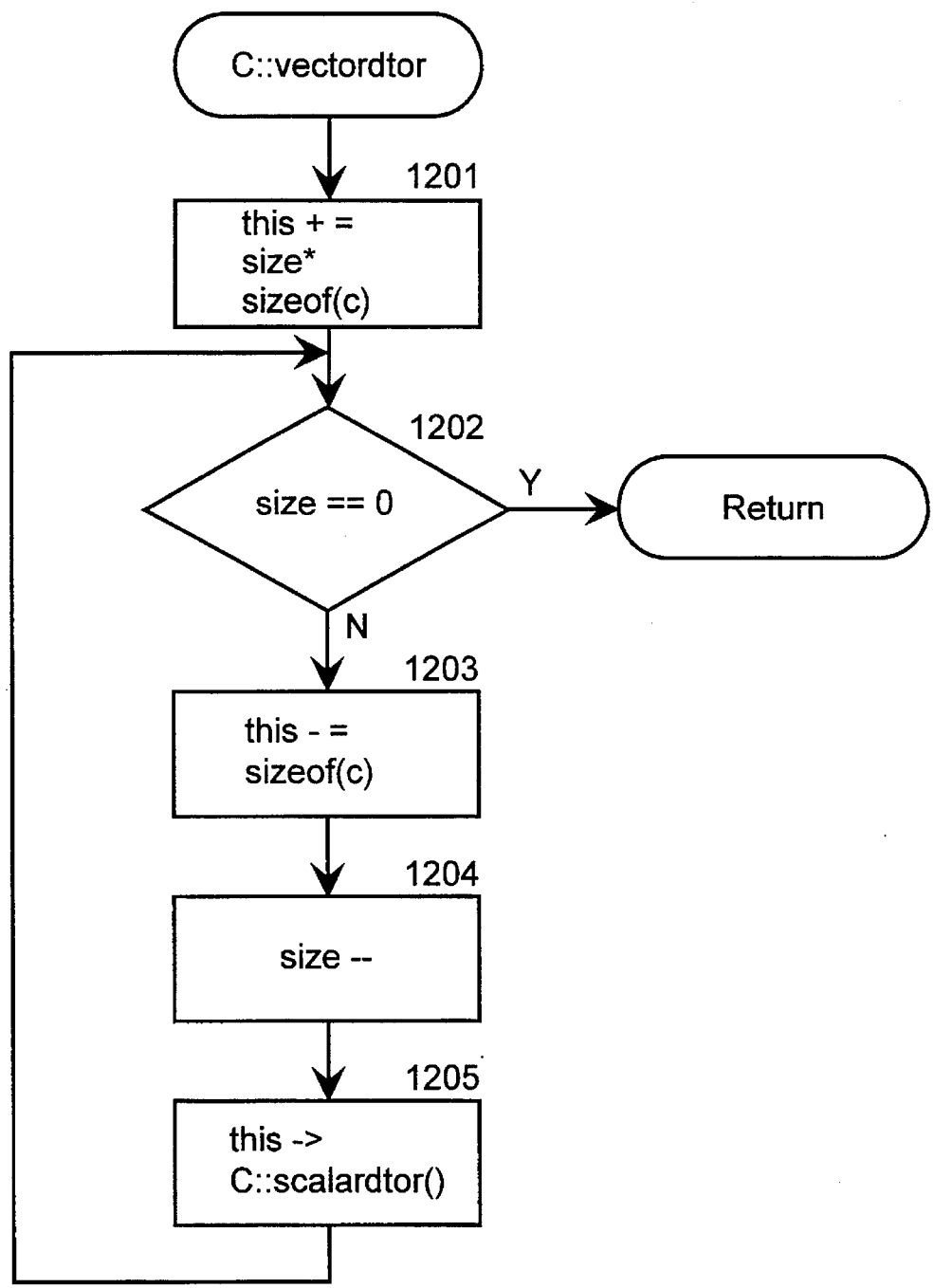

FIG. 12 is a flow diagram of the function C::vectordtor. Function C::vectordtor is passed the size of the vector (number of entries) and a this pointer for the first entry in the vector. The function C::vectordtor destroys the entries in the reverse order of their construction. In step 1201, the function C::vectordtor sets the this pointer to point to just past the last entry in the vector. In step 1202, if the size parameter equals 0, then the function C::vectordtor returns, else the function C::vectordtor continues at step 1203. In step 1203, the function C::vectordtor decrements the this pointer by the size of a class C object. In step 1204, the function C::vectordtor decrements the parameter size. In step 1205, the function C::vectordtor invokes the function C::scalardtor for the object pointed to by the this pointer and loops to step 1202 to process the next entry.

Figure 13:
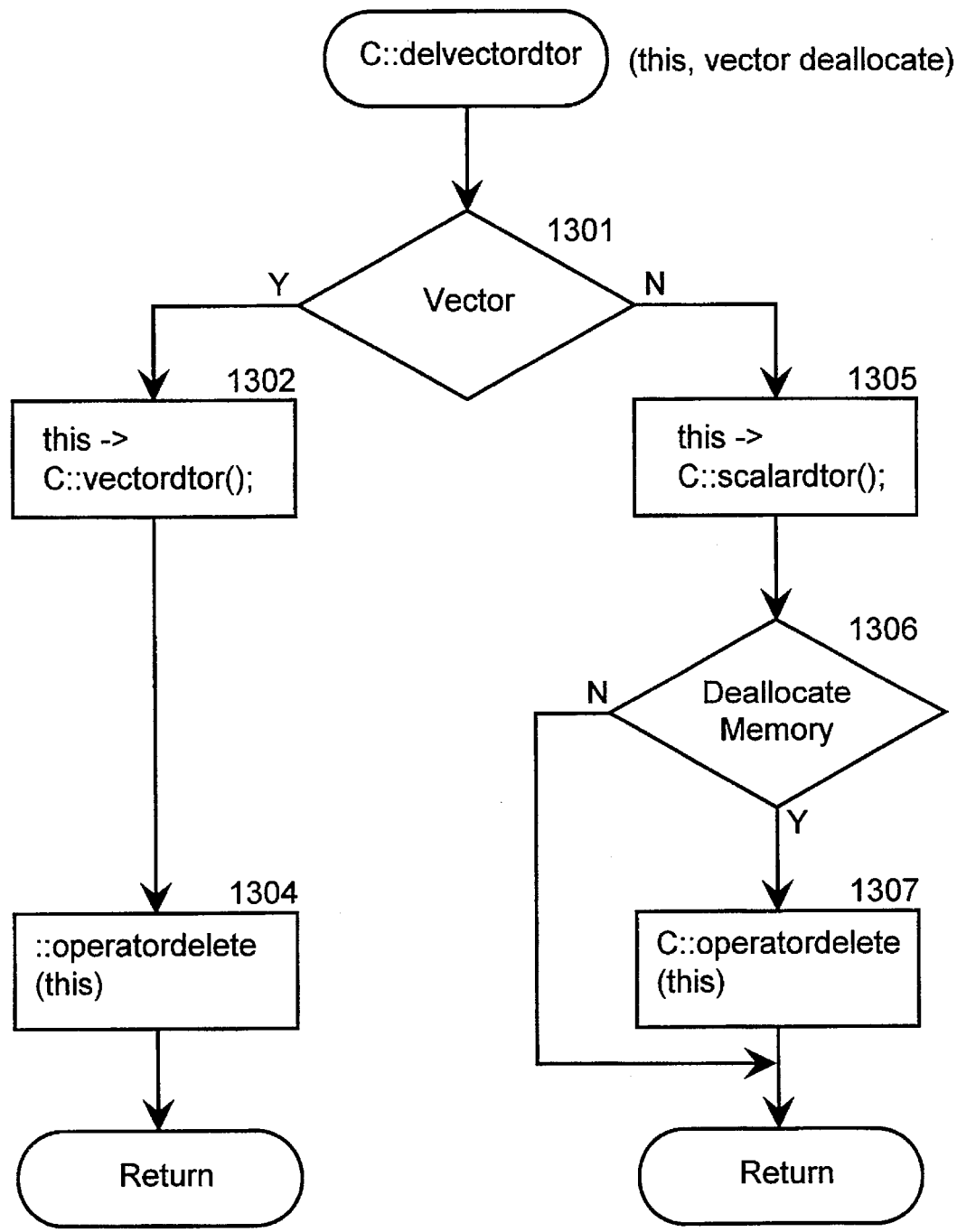

FIG. 13 is a flow diagram of function C::delvectordtor. This function is passed a parameter to indicate whether it is invoked to destroy a vector and a parameter to indicate whether the object is to be deallocated. In step 1301, if function C::delvectordtor is invoked to destroy a vector of C objects, then function C::delvectordtor continues at step 1302, else function C::delvectordtor continues at step 1305. In step 1302, function C::delvectordtor invokes function C::vectordtor passing a parameter indicating the size of the vector. Since memory is always to be deallocated for a vector in step 1304, function C::delvectordtor deallocates the memory by invoking the global function operator delete and returns. In step 1305, function C::delvectordtor invokes function C::scalardtor. In step 1306, if memory is to be deallocated for the C object, then function C::delvectordtor continues at step 1307, else the function C::delvectordtor returns. In step 1307, the function C::delvectordtor deallocates the memory by invoking the function operator delete for the class and returns. If no member function operator delete was declared, then the global function operator delete would be invoked in step 1307. In a preferred embodiment, the function C::delvectordtor returns an address for the object that can be passed to the global function operator delete to deallocate memory.

Figure 14:
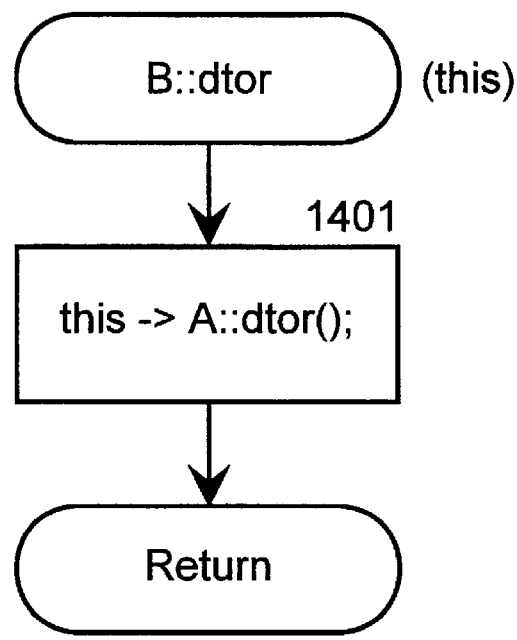

FIGS. 14 through 17 are flow diagrams of the functions invoked during destruction of a class C object to destroy inherited classes or data members. FIG. 14 is a flow diagram of function B::dtor. In step 1401, the function invokes function A::dtor for the occurrence of class A within an object of class B. The function then returns. In a preferred embodiment, since function B::dtor only invokes function A::dtor, the compiler generates code to invoke function A::dtor directly when destroying a B object.

Figure 15:
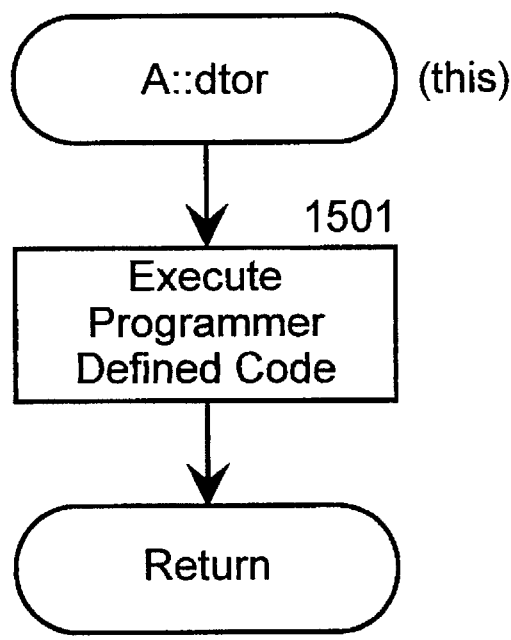

FIG. 15 is a flow diagram of the function A::dtor. In step 1501, the function executes the programmer-specified code for the destructor for class A. The function then returns.

Figure 16:
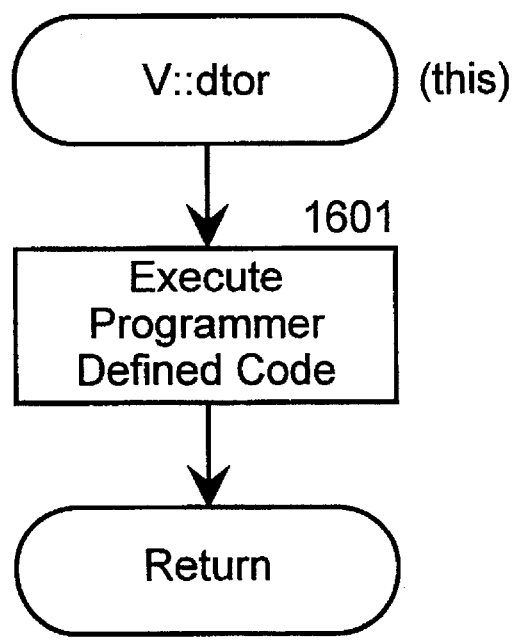

FIG. 16 is a flow diagram of function V::dtor. In step 1601, the function executes the programmer-specified code in the destructor for class V. The function then returns.

Figure 17:
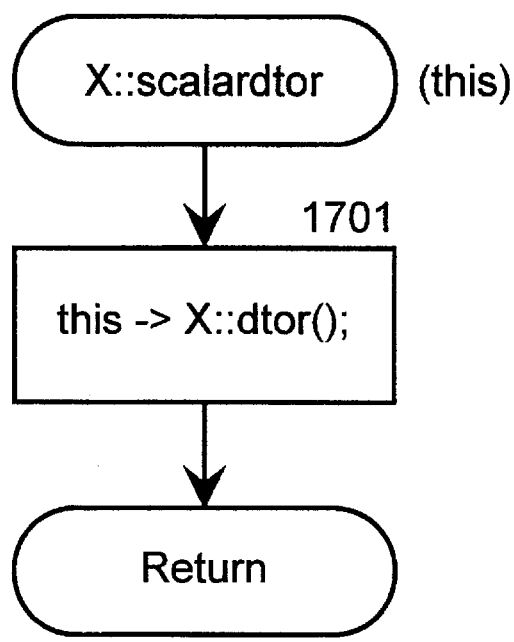

FIG. 17 is a flow diagram of function X::scalardtor. In step 1701, the function executes function X::dtor, which executes the programmer-specified code for class X, and the function then returns. In a preferred embodiment, when a function scalardtor invokes a function dtor without performing any other processing, then the call to the function scalardtor can be replaced by a call to function dtor directly.

Invoking Destructor Functions Directly

When an automatic object or vector of automatic objects goes out of scope, the compiler generates code to invoke function scalardtor or vectordtor, respectively. Since the compiler knows the type of object, it generates code to invoke these functions directly rather than through the virtual function table. The following statements illustrate when an object of class C goes out of scope.

```
{
    C  c;
    ...
}
```

When the compiler encounters the right bracket "}", it generates a call to function C::scalardtor, passing a pointer to object c. As shown in the flow diagram of FIG. 10, function C::scalardtor invokes function C::dtor and V::dtor. Function C::dtor executes the programmer-specified code and invokes function X::dtor and function B::dtor. Similarly, the following statements illustrate when a vector of objects of class C goes out of scope.

```
{
    C  c[5];
    ...
}
```

When the compiler encounters the right bracket "}", it generates a call to function C::vectordtor, passing a pointer to array c and the size of the array. As shown in the flow diagram of FIG. 12, function C::vectordtor invokes function C::scalardtor for each C object in the array.

The following statements create an object of class C invoke the destructor.

```
C *pc = new C;
...
pc->C::~( );
```

When the compiler encounters the statement that invokes the destructor, it generates code to access the destructor directly, not through the virtual function table. The compiler generates code to invoke C::scalardtor. The memory is not deallocated.

Invoking Destructor Functions Indirectly

In a preferred embodiment of the present invention, the compiler generates code to initialize the virtual function tables to point to the function delvectordtor. Thus, when a dynamic object is explicitly deleted, the destructor is invoked through the virtual function table. The following statements create an scalar object and delete the object.

```
C *pc = new C;
...
delete pc;
```

When the compiler encounters the delete statement, it generates code to access the destructor through the virtual function table. It passes the destructor a pointer to the object and parameters indicating that the memory is to be deallocated and that it is not a vector. When function C::delvectordtor is invoked, it executes steps 1305 through 1307 to invoke function C::scalardtor to deallocate memory using the function operator delete for the C class. The following statements create a vector object and delete the vector object.

```
C *pc = new C[5];
...
delete[ ] pc;
```

When the compiler encounters the delete[] statement, it generates code to access the destructor through the virtual function table. It passes the destructor a pointer to the first object in the vector and parameters indicating that the memory is to be deallocated and that a vector is to be destroyed. When function C::delvectordtor is invoked, it executes steps 1302 and 1304 to invoke function C:vectordtor to deallocate memory for the vector using the global function operator delete. The following statements create a C object and delete the object.

```
C *pc = new C;
...
::delete pc;
```

When the compiler encounters the ::delete statement, it generates code to invoke the destructor through the virtual function table and generates code to invoke the global function operator delete passing the address returned by the destructor. It passes the destructor a pointer to the object and parameters indicating that the object memory is not to be deallocated and that the object is not a vector. When function C::delvectordtor is invoked, it executes step 1305 to invoke function C::scalardtor, but does not execute step 1307 which would deallocate memory using the function operator delete for the class. Instead, the function C::delvectordtor returns the address of the object back to the caller, which invokes the global operator delete with the address. The following statements create a vector of C objects and delete the vector.

```
C *pc = new C[5];
...
::delete[ ] pc;
```

When the compiler encounters the ::delete[] statement, it generates code to access the destructor through the virtual function table of class C. It passes the destructor a pointer to the first object in the vector and parameters indicating that the memory is to be deallocated and that the object is a vector. When function C::delvectordtor is invoked, it executes steps 1302 and 1304 to invoke function C::vectordtor and to deallocate memory using the global function operator delete. The following statements create a object of class C and invoke the destructor.

```
C *pc = new C;
...
pc->~C( );
```

When the compiler encounters statement that invokes the destructor, it generates code to access the destructor through the virtual function table. It passes the destructor a pointer to the object, and parameters indicated that the memory is not to be deallocated and it is not a vector. When function C::delvectordtor is invoked, it executes step 1303 to invoke function C::scalardtor, but does not execute step 1305 to deallocate memory.

If a program does no dynamic allocation of an array of objects for a class, then the virtual function table entry for the destructor for that class can point to function delscalardtor, rather than function delvectordtor. In a preferred embodiment, the compiler generates no function delvectordtor for the class. Although the compiler may generate code expecting function delvectordtor to be invoked by passing a parameter indicating whether the destructor is being invoked for a vector, function delscalardtor ignores that parameter. In a preferred embodiment, the compiler generates a "Weak Extern" request to load the address of the function delvectordtor into the virtual function table. If this is not satisfied because the compiler did not generate the function, then the address of the function delscalardtor is loaded into the virtual function table.

Also, in a preferred embodiment, if a class has no virtual bases, then function dtor can be invoked directly rather than invoking function scalardtor which invokes function dtor.

Although the present invention has been described in terms of preferred embodiments, it is not intended that the invention be limited to these embodiments. Modifications within the spirit of the invention will be apparent to those skilled in the art. The scope of the present invention is defined by the claims that follow.

We claim:

1. A method in a computer compiler for generating code to destroy an object, the object having a class, the class having a destructor to destroy objects of the class, the method comprising the steps of:

generating a plurality of destructor functions for the class wherein each destructor function executes a subset of the destruction process; and generating code to invoke one of the plurality of destructor functions when an object of the class is to be destroyed.

2. The method of claim 1 wherein the step of generating a plurality of destructor functions generates a destructor function to destroy the object when the class is not a most-derived class for the object.

3. The method of claim 2 wherein the destructor function to destroy the object performs the steps of:

executing programmer-specified destruction processing, when specified by a programmer;

invoking destructors for data members of the class, when the data members have destructors; and invoking destructors for direct base classes of the class that have destructors.

4. The method of claim 1 wherein the step of generating a plurality of destructor functions generates a destructor function to destroy the object when the class is a most-derived class for the object.

5. The method of claim 4 wherein the destructor function to destroy the object performs the steps of:

executing programmer-specified destruction processing, when specified by a programmer;

invoking destructors for data members of the class, when the data members have destructors;

invoking destructors for direct base classes of the class, when the direct base classes have destructors; and invoking destructors for virtual base classes of the class, when the virtual base classes have destructors.

6. The method of claim 1 wherein the step of generating a plurality of destructor functions generates a destructor function to destroy the object when the class is a most-derived class for the object and to deallocate memory associated with the object using a memory deallocation function appropriate for the class.

7. The method of claim 6 wherein the destructor function to destroy the object and to deallocated memory associated with the object performs the steps of:

executing programmer-specified destruction processing, when specified by a programmer;

invoking destructors for data members of the class, when the data members have destructors;

invoking destructors for direct base classes of the class, when the direct base classes have destructors;

invoking destructors for virtual base classes of the class, when the virtual base classes have destructors; and deallocating memory associated with the object.

8. The method of claim 1 wherein the step of generating a plurality of destructor functions generates a destructor function to destroy an array of objects.

9. The method of claim 8 wherein the destructor function to destroy an array of objects performs for each object in the array the steps of:

executing programmer-specified destruction processing, when specified by a programmer;

invoking destructors for data members of the class, when the data members have destructors;

invoking destructors for direct base classes of the class, when the direct base classes have destructors; and invoking destructors for virtual base classes of the class, when the virtual base classes have destructors.

10. The method of claim 1 wherein the step of generating a plurality of destructor functions generates a destructor function to destroy an array of objects and to deallocate memory associated with the array of objects.

11. The method of claim 10 wherein the destructor function to destroy an array of objects and to deallocate memory associated with the array of objects performs the steps of:

for each object in the array, executing programmer-specified destruction processing, when specified by a programmer;

invoking destructors for data members of the class, when the data members have destructors;

invoking destructors for direct base classes of the class, when the direct base classes have destructors; and invoking destructors for virtual base classes of the class, when the virtual base classes have destructors; and deallocating the memory associated with the array of objects.

12. A method in a computer system for destroying an occurrence of a base class within a derived class, the method comprising the computer-implemented steps of:

invoking a destructor function of the base class without passing an indication that the occurrence of the base class is within the derived class; and under control of the destructor function, controlling
destruction of the occurrence of the base class.

13. The method of claim 12 further including:
under control of the destructor function,
when a programmer-defined destructor is specified for the class, executing the programmer-defined destructor;
when the class has a data member with a destructor function, invoking the destructor function of the data member; and
when the class has a non-virtual direct base class with a destructor function, invoking the destructor function of the non-virtual base class.

14. A method in a computer system for destroying an object of a class when the class is a most-derived class, the method comprising the computer-implemented steps of:
invoking a scalar destructor function of the class without passing an indication that the class is a most-derived class; and
under control of the scalar destructor function, controlling destruction of the object of the class.

15. The method of claim 14 further including:
under control of the scalar destructor function,
performing steps for destroying an occurrence of the class when the class is not a most-derived class; and
when the class has a virtual base class with a destructor function, invoking the destructor function for the virtual base class.

16. The method of claim 15 wherein the step of performing includes:
when a programmer-defined destructor is specified for the class, executing the programmer-defined destructor;
when the class has a data member with a destructor function, invoking the destructor function of the data member; and
when the class has a non-virtual direct base class with a destructor function, invoking the destructor function of the non-virtual base class.

17. The method of claim 15 wherein the step of performing includes:
invoking a destructor function that performs the steps of
when a programmer-defined destructor is specified for the class, executing the programmer-defined destructor;
when the class has a data member with a destructor function, invoking the destructor function of the data member; and
when the class has a non-virtual direct base class with a destructor function, invoking the destructor function of the non-virtual base class.

18. A method in a computer system for destroying an object of a class when the class is a most-derived class, the method comprising the computer-implemented steps of:
invoking a delete scalar destructor function of the class without passing an indication that the class is a most-derived class; and
under control of the delete scalar destructor function, controlling destruction of the object and deallocating memory for the object.

19. The method of claim 18 further including:
under control of the delete scalar destructor function,
invoking a scalar destructor function for destroying the object when the class is a most-derived class without deallocating memory for the object; and
deallocating memory for the object.

20. The method of claim 19 further including:
under control of the scalar destructor function,
performing steps for destroying an occurrence of the class when the class is not a most-derived class; and
when the class has a virtual base class with a destructor function, invoking the destructor function for the virtual base class.

21. The method of claim 20 wherein the step of performing includes:
when a programmer-defined destructor is specified for the class, executing the programmer-defined destructor;
when the class has a data member with a destructor function, invoking the destructor function of the data member; and
when the class has a non-virtual direct base class with a destructor function, invoking the destructor function of the non-virtual base class.

22. The method of claim 20 wherein the step of performing includes:
invoking a destructor function that performs the steps of
when a programmer-defined destructor is specified for the class, executing the programmer-defined destructor;
when the class has a data member with a destructor function, invoking the destructor function of the data member; and
when the class has a non-virtual direct base class with a destructor function, invoking the destructor function of the non-virtual base class.

23. A method in a computer system for generating a hierarchy of destructor functions for controlling the destruction of objects of a class, the method comprising the computer-implemented steps of:
creating an occurrence destructor function for controlling destruction of an occurrence of the class when the class is not a most-derived class;
creating a scalar destructor function for controlling destruction of an object of the class when the class is a most-derived class, wherein the scalar destructor function invokes the occurrence destructor function.

24. The method of claim 23 wherein the occurrence destructor function
executes a programmer-defined destructor for the class, when the class has the programmer-defined destructor;
invokes a data member destructor function for a data member of the class, when the data member has the data member destructor function; and
invokes a non-virtual direct base class destructor function for a non-virtual direct base class of the class, when the class has a non-virtual direct base class with the non-virtual direct base class destructor function.

25. The method of claims 23 or 24 wherein the scalar destructor function after invoking the occurrence destructor function, invokes a virtual base class destructor function for a virtual base class of the class, when the class has a virtual base class with the virtual base class destructor function.

26. The method of claim 25 including the step of:
creating a delete scalar destructor function for controlling destruction of an object of the class when the class is a most-derived class and for deallocating memory for the object, wherein the delete scalar destructor function invokes the scalar destructor function and deallocates memory for the object when passed an indication to deallocate memory for the object.

27. The method of claim 23 including the step of:

creating a vector destructor function for controlling destruction of an array of objects of the class when the class is a most-derived class, wherein the vector destructor function invokes the scalar destructor function for each object in the array.

28. The method of claim 27 including the step of:

creating a delete vector destructor function for controlling destruction of an array of objects of the class when the class is a most-derived class and for deallocating memory for the array, wherein the delete vector destructor function invokes the vector destructor function and deallocates memory for the array.

29. The method of claim 27 including the step of:

creating a delete vector destructor function for controlling destruction of an array of objects of the class when the class is a most-derived class and for deallocating memory for the array, wherein the delete vector destructor function invokes the vector destructor function and deallocates memory for the array when passed an indication to deal locate memory for the array.

30. The method of claim 27 including the step of:

creating a delete vector destructor function for controlling destruction of objects of the class when a destructor for the class is specified to be virtual, wherein the delete vector destructor function when passed an indication that an array of objects of the class is to be destroyed, invokes the vector destructor function and deallocates memory for the array; and when passed an indication that a single object of the class is to be destroyed, invokes the scalar destructor function and deallocates memory for the single object when passed an indication to deallocate memory for the single object.

31. A method in a computer system for generating multiple destructor functions for destroying objects of a class, the method comprising the steps of:

creating an occurrence destructor function for controlling destruction of an object of the class when the class is not a most-derived class; and creating a scalar destructor function for controlling destruction of an object of the class when the class is a most-derived class.

32. The method of claim 31 wherein the scalar destructor function invokes the occurrence destructor function.

33. The method of claims 31 or 32 wherein the scalar destruction function is a delete scalar destructor function that deallocates memory for the object.

34. The method of claim 31 including creating a delete scalar function for controlling destruction of an object of the class when the class is a most-derived and for deallocating memory for the object.

35. The method of claim 34 wherein the delete scalar function invokes the scalar function.

36. A method in a computer system for generating code for destroying an object of a class, the method comprising the computer-implemented steps of:

determining a characteristic of instantiation of the class of the object;

generating a destructor function for controlling destruction of the object based on the determined characteristic; and when the object is to be destroyed, generating an invocation of the generated destructor function.

37. The method of claim 36 wherein the determined characteristic is whether the object is an automatic object or a dynamically allocated object.

38. The method of claim 37 wherein the object is an automatic object, and further including:

generating the destructor function as a scalar destructor function for controlling destruction of the object and without having computer code for deallocating memory of the object; and when the object goes out of scope, generating the invocation as an invocation of the scalar destructor function wherein the invocation does not include passing an indication that memory for the object is not to be deallocated.

39. The method of claim 37 wherein the object is an automatic object, and further including:

generating the destructor function as a scalar destructor function consisting essentially of the steps of:
when the class has a programmer-defined destructor, executing the programmer-defined destructor;
when a data member of the class has a data member destructor function, invoking the data member destructor function;
when a non-virtual direct base class of the class has a non-virtual direct base class destructor function, invoking the non-virtual direct base class destructor function; and
when a virtual base class of the class has a virtual base class destructor function, invoking the virtual base class destructor function; and when the object goes out of scope, generating the invocation as an invocation of the scalar destructor function.

40. The method of claims 38 or 39 including generating the invocation of the scalar destructor function as a direct invocation, rather than an indirect invocation through a virtual function table of the class.

41. The method of claim 37 wherein the object is within an array of objects of the class and the array is an automatic array and further including:

generating the destructor function as a vector destructor function for controlling destruction of the array and without having computer code for deallocating memory of the array; and when the array goes out of scope, generating the invocation as an invocation of the vector destructor function wherein the invocation does not include passing an indication that memory for the array is not to be deallocated.

42. The method of claim 37 wherein the object is within an array of objects of the class and the array is an automatic array and further including:

generating the destructor function as a vector destructor function consisting essentially of the steps of, for each object in the array,
when the class has a programmer-defined destructor, executing the programmer-defined destructor;
when a data member of the class has a data member destructor function, invoking the data member destructor function;
when a non-virtual direct base class of the class has a non-virtual direct base class destructor function, invoking the non-virtual direct base class destructor function; and
when a virtual base class of the class has a virtual base class destructor function, invoking the virtual base class destructor function; and when the array goes out of scope, generating the invocation as an invocation of the vector destructor function.

43. The method of claims 41 or 42 including generating the invocation of the vector destructor function as a direct invocation, rather than an indirect invocation through a virtual function table of the class.

44. The method of claim 37 wherein the object is a dynamically allocated object and further including:

generating the destructor function as a scalar destructor function for controlling destruction of the object and without having computer code for deallocating memory of the object; and when a destructor for the class is explicitly invoked and the invocation explicitly indicates to resolve the destructor to the destructor for the class, generating the invocation as an invocation of the scalar destructor function object wherein the invocation does not include passing an indication that memory for the object is not to be deallocated.

45. The method of claim 37 wherein the object is a dynamically allocated object and further including:

generating the destructor function as a scalar destructor function consisting essentially of the steps of when the class has a programmer-defined destructor, executing the programmer-defined destructor;

when a data member of the class has a data member destructor function, invoking the data member destructor function;

when a non-virtual direct base class of the class has a non-virtual direct base class destructor function, invoking the non-virtual direct base class destructor function; and when a virtual base class of the class has a virtual base class destructor function, invoking the virtual base class destructor function; and when a destructor for the class is explicitly invoked and the invocation explicitly indicates to resolve the destructor to the destructor for the class, generating the invocation as an invocation of the scalar destructor function.

46. The method of claims 44 or 45 includes generating the invocation of the scalar destructor function as a direct invocation, rather than an indirect invocation through a virtual function table of the class.

47. The method of claim 37 wherein the object is a dynamically allocated object and further including:

generating the destructor function as a delete scalar destructor function for controlling destruction of the object and having computer code for deallocating memory for the object;

setting a virtual function table for the class to contain a reference to the delete scalar destructor function; and when the object is destroyed using a non-global operator delete, generating the invocation as an indirect invocation of the delete scalar destructor function through the virtual function table wherein the invocation includes passing an indication that memory for the object is to be deallocated.

48. The method of claim 37 wherein the object is a dynamically allocated object and further including:

generating the destructor function as a delete scalar destructor function consisting essentially of the steps of:

when the class has a programmer-defined destructor, executing the programmer-defined destructor;

when a data member of the class has a data member destructor function, invoking the data member destructor function;

when a non-virtual direct base class of the class has a non-virtual direct base class destructor function, invoking the non-virtual direct base class destructor function;

when a virtual base class of the class has a virtual base class destructor function, invoking the virtual base class destructor function; and deallocating memory for the object;

setting a virtual function table for the class to contain a reference to the delete scalar destructor function; and when the object is destroyed using a non-global operator delete, generating the invocation as an indirect invocation of the delete scalar destructor function through the virtual function table.

49. The method of claim 37 wherein the object is a dynamically allocated object of the class and further including:

generating the destructor function as a delete vector destructor function for controlling destruction of the object, the delete vector destructor function having computer code for destroying and deallocating an array of objects of the class when the object is within an array of objects of the class and for destroying and deallocating the object when the object is not within an array of objects of the class.

50. The method of claim 37 wherein the object is a dynamically allocated object of the class and further including:

generating the destructor function as a delete vector destructor function that is passed an indication whether an array of objects is being destroyed and an indication whether to deallocate memory for an object that is not within an array, the delete vector destructor function consisting essentially of the steps of:

when the object that is not within an array is being destroyed, when the class has a programmer-defined destructor, executing the programmer-defined destructor;

when a data member of the class has a data member destructor function, invoking the data member destructor function;

when a non-virtual direct base class of the class has a non-virtual direct base class destructor function, invoking the non-virtual direct base class destructor function;

when a virtual base class of the class has a virtual base class destructor function, invoking the virtual base class destructor function; and when memory for the object is to be deallocated, deallocating memory for the object; and when an array objects is being destroyed, for each object in the array, when the class has a programmer-defined destructor, executing the programmer-defined destructor;

when a data member of the class has a data member destructor function, invoking the data member destructor function;

when a non-virtual direct base class of the class has a non-virtual direct base class destructor function, invoking the non-virtual direct base class destructor function; and when a virtual base class of the class has a virtual base class destructor function, invoking the virtual base class destructor function; and deallocating memory for the array.

51. The method of claims 49 or 50 further including:

setting a virtual function table for the class to contain a reference to the delete vector destructor function; and when the object is destroyed using a non-global operator delete, generating the invocation as an indirect invocation of the delete vector destructor function through the virtual function table passing an indication that the object is not within an array and an indication that memory for the object is to be deallocated.

52. The method of claims 49 or 50 further including:

setting a virtual function table for the class to contain a reference to the delete vector destructor function; and when an array of dynamically allocated objects of the class is destroyed using an operator delete, generating the invocation as an indirect invocation of the delete vector destructor function through the virtual function table passing an indication that an array is being destroyed.

53. The method of claim 52 wherein the array is destroyed using a global operator delete.

54. The method of claim 52 wherein the array is destroyed using a non-global operator delete.

55. The method of claims 49 or 50 further including:

when the object is deleted using a global operator delete, generating the invocation as an indirect invocation of the delete vector destructor function through the virtual function table passing an indication that an array is not being destroyed and an indication that memory for the object is not to be deallocated; and generating an invocation to the global operator delete to deallocate memory for the object.

56. The method of claims 49 or 50 further including:

setting a virtual function table for the class to contain a reference to the delete vector destructor function; and when a destructor is explicitly invoked for the object and the invocation does not explicitly indicate to resolve the destructor to the destructor for the class, generating the invocation as an indirect invocation of the delete vector destructor function through the virtual function table passing an indication that an array is not being destroyed and an indication that memory for the object is not to be deallocated.

57. The method of claim 37 wherein the object is a dynamically allocated object of the class and further including:

generating the destructor function as a delete scalar destructor function for controlling the destruction and deallocation of the object.

58. The method of claim 37 wherein the object is a dynamically allocated object of the class and further including:

generating the destructor function as a delete scalar destructor function that is passed an indication whether to deallocate memory for the object, the delete scalar destruction function consisting essentially of the steps of:

when the class has a programmer-defined destructor, executing the programmer-defined destructor;

when a data member of the class has a data member destructor function, invoking the data member destructor function;

when a non-virtual direct base class of the class has a non-virtual direct base class destructor function, invoking the non-virtual direct base class destructor function;

when a virtual base class of the class has a virtual base class destructor function, invoking the virtual base class destructor function; and when the indication indicates that memory for the object is to be deallocated, deallocating memory for the object.

59. The method of claims 57 or 58 further including:

setting a virtual function table for the class to contain a reference to the delete scalar destructor function; and when the object is destroyed using a non-global operator delete, generating the invocation as an indirect invocation of the delete scalar destructor function through the virtual function table passing an indication that memory for the object is to be deallocated.

60. The method of claims 57 or 58 further including:

when the object is destroyed using a global operator delete, generating the invocation as an indirect invocation of the delete scalar destructor function through the virtual function table passing an indication that memory for the object is not to be deallocated; and generating an invocation to the global operator delete to deallocate memory for the object.

61. The method of claims 57 or 58 further including:

setting a virtual function table for the class to contain a reference to the delete scalar destructor function; and when a destructor is explicitly invoked for the object and the invocation does not explicitly indicate to resolve the destructor to a destructor for the class, generating the invocation as an indirect invocation of the delete scalar destructor function through the virtual function table passing an indication that memory for the object is not to be deallocated.

62. The method of claim 37 wherein the object is a dynamically allocated object of the class and further including:

generating the destructor function as a delete scalar destructor function for controlling destruction of the object, the delete scalar destructor function having computer code for deallocating memory of the object;

setting a virtual function table for the class to contain a reference to the delete scalar destructor function; and when the object is destroyed using a global operator delete, generating the invocation as an indirect invocation of the delete scalar destructor function through the virtual function table passing an indication that memory for the object is not to be deallocated; and generating an invocation of the global delete function to deallocate memory for the object.

63. The method of claim 37 wherein the object is a dynamically allocated object of the class and further including:

generating the destructor function as a scalar destructor function for controlling destruction of the object and without having computer code for deallocating memory for the object.

64. The method of claim 37 wherein the object is a dynamically allocated object of the class and further including:

generating the destructor function as a scalar destructor function consisting essentially of the steps of:

when the class has a programmer-defined destructor, executing the programmer-defined destructor;

when a data member of the class has a data member destructor function, invoking the data member destructor function;

when a non-virtual direct base class of the class has a non-virtual direct base class destructor function, invoking the non-virtual direct base class destructor function; and when a virtual base class of the class has a virtual base class destructor function, invoking the virtual base class destructor function.

65. The method of claims 63 or 64 further including:

setting a virtual function table for the class to contain a reference to the scalar destructor function; and when the object is deleted using a global operator delete, generating the invocation as an indirect invocation of the scalar destructor function through the virtual function table; and generating an invocation to the global operator delete to deallocate memory for the object.

66. The method of claims 63 or 64 further including:

setting a virtual function table for the class to contain a reference to the scalar destructor function; and when a destructor is explicitly invoked for the object and the invocation does not explicitly indicate to resolve the destructor to a destructor for the class, generating the invocation as an indirect invocation of the scalar destructor function through the virtual function table.

67. A computer-readable storage device containing instructions for controlling a computer system to perform a method in a computer compiler for generating code to destroy an object, the object having a class, the class having a destructor to destroy objects of the class, the method comprising the steps of:

generating a plurality of destructor functions for the class wherein each destructor function executes a subset of the destruction process; and generating code to invoke one of the plurality of destructor functions when an object of the class is to be destroyed.

68. A computer-readable storage device containing instructions for controlling a computer system to perform the method of claim 67 wherein the step of generating a plurality of destructor functions generates a destructor function to destroy the object when the class is not a most-derived class for the object.

69. A computer-readable storage device containing instructions for controlling a computer system to perform the method of claim 68 wherein the destructor function to destroy the object performs the steps of:

executing programmer-specified destruction processing, when specified by a programmer;

invoking destructors for data members of the class, when the data members have destructors; and invoking destructors for direct base classes of the class that have destructors.

70. A computer-readable storage device containing instructions for controlling a computer system to perform the method of claim 67 wherein the step of generating a plurality of destructor functions generates a destructor function to destroy the object when the class is a most-derived class for the object.

71. A computer-readable storage device containing instructions for controlling a computer system to perform the method of claim 70 wherein the destructor function to destroy the object performs the steps of:

executing programmer-specified destruction processing, when specified by a programmer;

invoking destructors for data members of the class, when the data members have destructors;

invoking destructors for direct base classes of the class, when the direct base classes have destructors; and invoking destructors for virtual base classes of the class, when the virtual base classes have destructors.

72. A computer-readable storage device containing instructions for controlling a computer system to perform the method of claim 67 wherein the step of generating a plurality of destructor functions generates a destructor function to destroy the object when the class is a most-derived class for the object and to deallocate memory associated with the object using a memory deallocation function appropriate for the class.

73. A computer-readable storage device containing instructions for controlling a computer system to perform the method of claim 72 wherein the destructor function to destroy the object and to deallocated memory associated with the object performs the steps of:

executing programmer-specified destruction processing, when specified by a programmer;

invoking destructors for data members of the class, when the data members have destructors;

invoking destructors for direct base classes of the class, when the direct base classes have destructors;

invoking destructors for virtual base classes of the class, when the virtual base classes have destructors; and deallocating memory associated with the object.

74. A computer-readable storage device containing instructions for controlling a computer system to perform the method of claim 67 wherein the step of generating a plurality of destructor functions generates a destructor function to destroy an array of objects.

75. A computer-readable storage device containing instructions for controlling a computer system to perform the method of claim 74 wherein the destructor function to destroy an array of objects performs for each object in the array the steps of:

executing programmer-specified destruction processing, when specified by a programmer;

invoking destructors for data members of the class, when the data members have destructors;

invoking destructors for direct base classes of the class, when the direct base classes have destructors; and invoking destructors for virtual base classes of the class, when the virtual base classes have destructors.

76. A computer-readable storage device containing instructions for controlling a computer system to perform the method of claim 67 wherein the step of generating a plurality of destructor functions generates a destructor function to destroy an array of objects and to deallocate memory associated with the array of objects.

77. A computer-readable storage device containing instructions for controlling a computer system to perform the method of claim 76 wherein the destructor function to destroy an array of objects and to deallocate memory associated with the array of objects performs the steps of:

for each object in the array, executing programmer-specified destruction processing, when specified by a programmer;

invoking destructors for data members of the class, when the data members have destructors;

invoking destructors for direct base classes of the class, when the direct base classes have destructors; and invoking destructors for virtual base classes of the class, when the virtual base classes have destructors; and deallocating the memory associated with the array of objects.

78. A computer-readable storage device containing instructions for controlling a computer system to perform a method in a computer system for destroying an occurrence of a base class within a derived class, the method comprising the computer-implemented steps of:

invoking a destructor function of the base class without passing an indication that the occurrence of the base class is within the derived class; and under control of the destructor function, controlling destruction of the occurrence of the base class.

79. A computer-readable storage device containing instructions for controlling a computer system to perform the method of claim 78 further including:

under control of the destructor function,
when a programmer-defined destructor is specified for the class, executing the programmer-defined destructor;
when the class has a data member with a destructor function, invoking the destructor function of the data member; and
when the class has a nonvirtual direct base class with a destructor function, invoking the destructor function of the non-virtual base class.

80. A computer-readable storage device containing instructions for controlling a computer system to perform a method in a computer system for destroying an object of a class when the class is a most-derived class, the method comprising the computer-implemented steps of:

invoking a scalar destructor function of the class without passing an indication that the class is a most-derived class; and under control of the scalar destructor function, controlling destruction of the object of the class.

81. A computer-readable storage device containing instructions for controlling a computer system to perform the method of claim 80 further including:

under control of the scalar destructor function,
performing steps for destroying an occurrence of the class when the class is not a most-derived class; and
when the class has a virtual base class with a destructor function, invoking the destructor function for the virtual base class.

82. A computer-readable storage device containing instructions for controlling a computer system to perform the method of claim 81 wherein the step of performing includes:

when a programmer-defined destructor is specified for the class, executing the programmer-defined destructor;
when the class has a data member with a destructor function, invoking the destructor function of the dam member; and
when the class has a non-virtual direct base class with a destructor function, invoking the destructor function of the non-virtual base class.

83. A computer-readable storage device containing instructions for controlling a computer system to perform the method of claim 81 wherein the step of performing includes:

invoking a destructor function that performs the steps of
when a programmer-defined destructor is specified for the class, executing the programmer-defined destructor;
when the class has a data member with a destructor function, invoking the destructor function of the data member; and
when the class has a non-virtual direct base class with a destructor function, invoking the destructor function of the non-virtual base class.

* * * * *